(12) United States Patent
Seibold

(10) Patent No.: US 12,157,402 B2
(45) Date of Patent: Dec. 3, 2024

(54) SEAT FOR VEHICLE

(71) Applicant: Yanfeng International Seating Systems Co., Ltd., Novi, MI (US)

(72) Inventor: Kurt Seibold, Farmington Hills, MI (US)

(73) Assignee: Yanfeng International Seating Systems Co., Ltd.

( * ) Notice: Subject to any disclaimer, the term of this patent is extended or adjusted under 35 U.S.C. 154(b) by 0 days.

(21) Appl. No.: 18/630,119

(22) Filed: Apr. 9, 2024

(65) Prior Publication Data
US 2024/0253528 A1 Aug. 1, 2024

Related U.S. Application Data

(63) Continuation of application No. PCT/US2023/083106, filed on Dec. 8, 2023.
(Continued)

(51) Int. Cl.
*B60N 2/90* (2018.01)
*B60N 2/02* (2006.01)
(Continued)

(52) U.S. Cl.
CPC ........... *B60N 2/02* (2013.01); *B60N 2/42763* (2013.01); *B60N 2/62* (2013.01); *B60N 2/914* (2018.02); *B60N 2002/022* (2013.01)

(58) Field of Classification Search
CPC ...... B60N 2/62; B60N 2/914; B60N 2/42763; B60N 2/1615
See application file for complete search history.

(56) References Cited

U.S. PATENT DOCUMENTS 4,629,248 A * 12/1986 Mawbey .................. B60N 2/62
297/284.11
4,690,456 A 9/1987 Chiba et al.
(Continued)

FOREIGN PATENT DOCUMENTS

CN 115230549 A * 10/2022 ............. A61H 1/005
CN 115534779 A * 12/2022
(Continued)

OTHER PUBLICATIONS

International Search Report and Written Opinion for International Application Serial No. PCT/US2023/083106 dated Feb. 16, 2024, 17 pages.

*Primary Examiner* — Timothy J Brindley
(74) *Attorney, Agent, or Firm* — Amin, Turocy & Watson, LLP

(57) ABSTRACT

A seat for a vehicle may comprise a back assembly; a cushion assembly comprising a cushion frame coupled to a base frame; and an adjustment mechanism to raise and lower the cushion frame relative to the base frame. The adjustment mechanism may comprise a frame and an adjuster. The frame may comprise an interface comprising a dome-shaped seat for the adjuster. The seat may comprise an interface comprising a recess for the adjuster at the cushion frame. The adjuster may comprise a bladder to be inflated for a raised position; the actuator may comprise a pneumatic actuator. The bladder may be cylindrical, disc-shaped, ball-shaped, multi-segment, etc. The adjustment mechanism may comprise a stop and a frame such as an interface, bracket, compliant element, etc. The cushion frame may be pivotally coupled with the base frame. The adjustment mechanism may comprise a set of adjusters.

20 Claims, 18 Drawing Sheets

Related U.S. Application Data

(60) Provisional application No. 63/431,459, filed on Dec. 9, 2022.

(51) Int. Cl.
  *B60N 2/427* (2006.01)
  *B60N 2/62* (2006.01)

(56) References Cited

U.S. PATENT DOCUMENTS

| | | | |
|---|---|---|---|
| 4,915,447 A | 4/1990 | Shovar | |
| 5,082,326 A * | 1/1992 | Sekido | B60N 2/885 |
| | | | 297/284.6 |
| 6,203,105 B1 | 3/2001 | Rhodes | |
| 6,890,030 B2 | 5/2005 | Wilkerson et al. | |
| 8,616,654 B2 | 12/2013 | Zenk et al. | |
| 9,321,373 B2 * | 4/2016 | Sakata | B60N 2/62 |
| 9,731,638 B2 | 8/2017 | Benson et al. | |
| 9,738,187 B1 * | 8/2017 | McCoy | B60N 2/4279 |
| 9,896,003 B2 * | 2/2018 | Tamura | B60N 2/2222 |
| 9,896,007 B2 * | 2/2018 | Ohno | B60N 2/885 |
| 10,086,731 B2 * | 10/2018 | Hall | B60N 2/914 |
| 10,106,061 B2 * | 10/2018 | Dry | B60N 2/665 |
| 10,286,818 B2 * | 5/2019 | Line | B60N 2/99 |
| 2010/0066142 A1 * | 3/2010 | Gross | B60N 2/42763 |
| | | | 297/284.1 |
| 2010/0289302 A1 | 11/2010 | Cheng | |
| 2014/0306504 A1 * | 10/2014 | Boy | B60N 2/62 |
| | | | 297/313 |
| 2014/0333107 A1 * | 11/2014 | Seki | B60N 2/161 |
| | | | 297/284.1 |
| 2017/0240074 A1 * | 8/2017 | McCoy | B60N 2/4279 |
| 2018/0079335 A1 * | 3/2018 | Jaranson | B60N 2/665 |
| 2018/0222362 A1 * | 8/2018 | Line | B60N 2/34 |
| 2020/0391686 A1 | 12/2020 | Kaisha et al. | |
| 2021/0001755 A1 * | 1/2021 | Sulaiman | B60N 2/1615 |
| 2021/0146805 A1 * | 5/2021 | Suzuki | F16H 19/04 |
| 2024/0157861 A1 * | 5/2024 | Scheede | B60N 2/181 |

FOREIGN PATENT DOCUMENTS

| | | | | |
|---|---|---|---|---|
| JP | 2015116835 A * | 6/2015 | | B60N 2/2222 |
| WO | WO-2021125254 A1 * | 6/2021 | | B60N 2/02 |

* cited by examiner

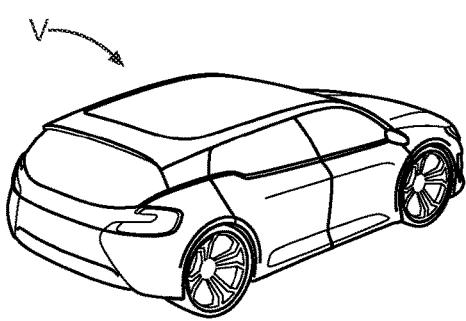
FIG. 1A
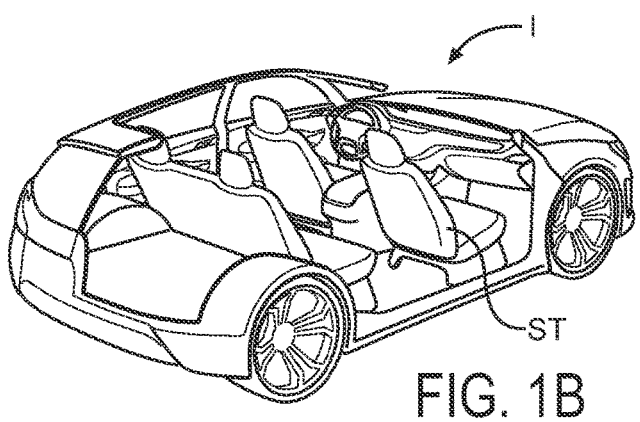
FIG. 1B
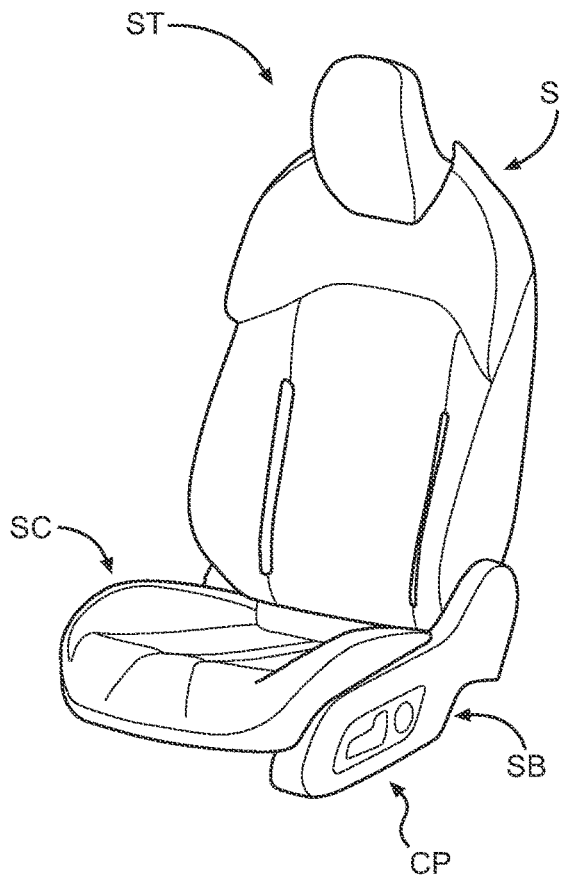
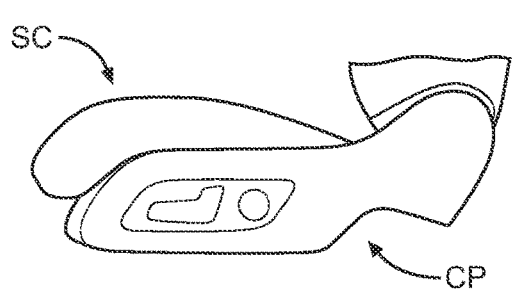
FIG. 2A
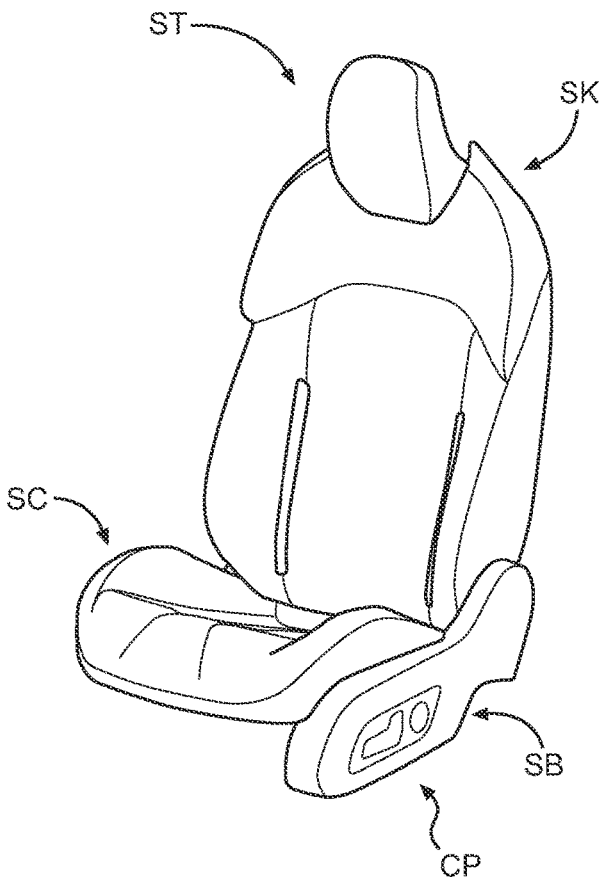
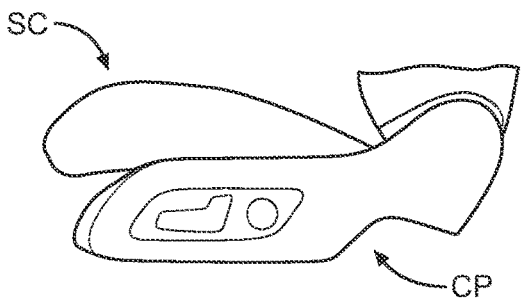
FIG. 2B

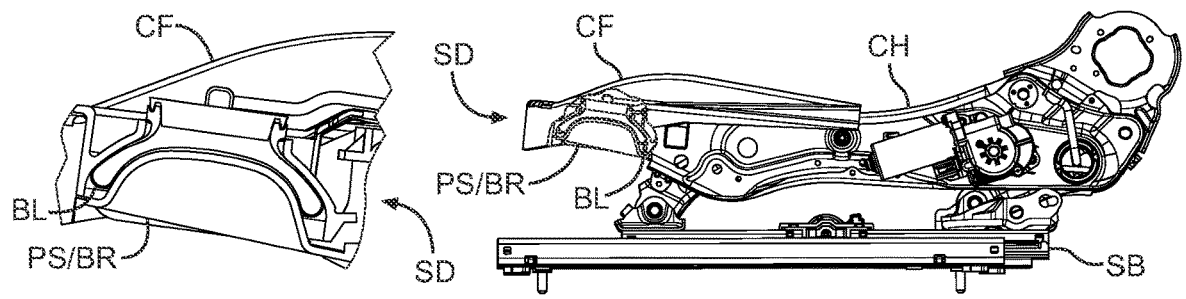
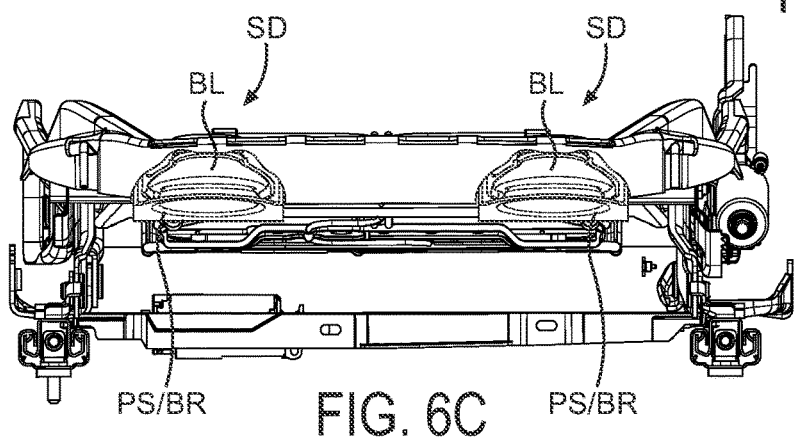
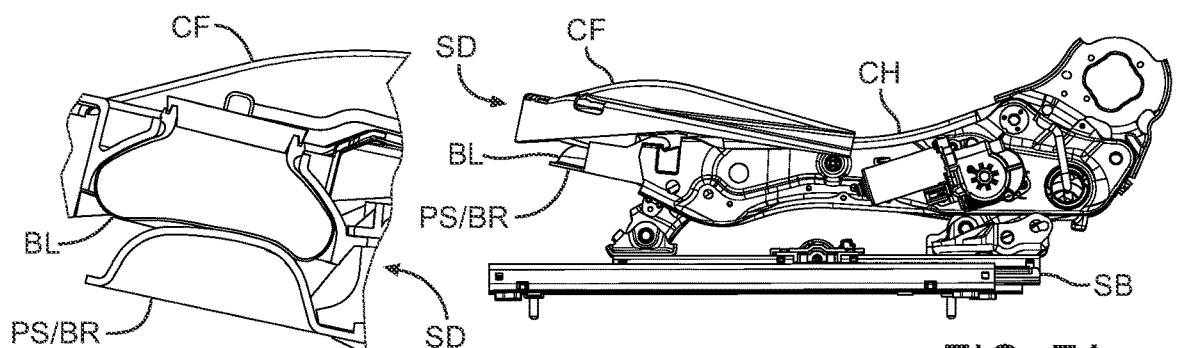
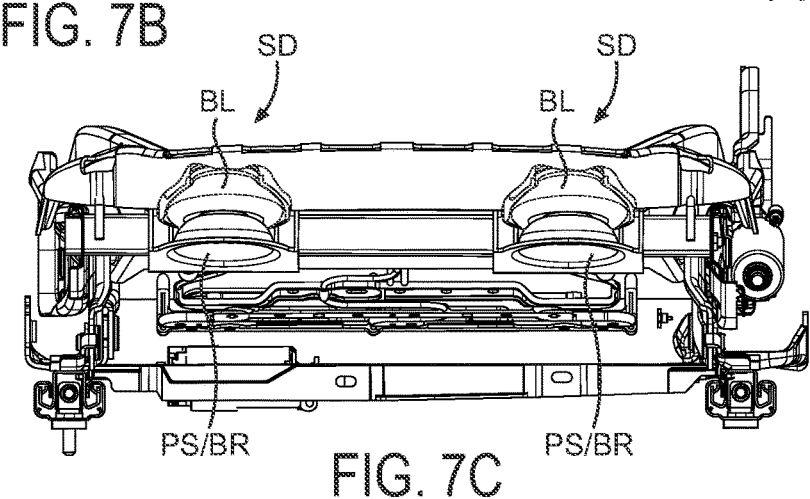

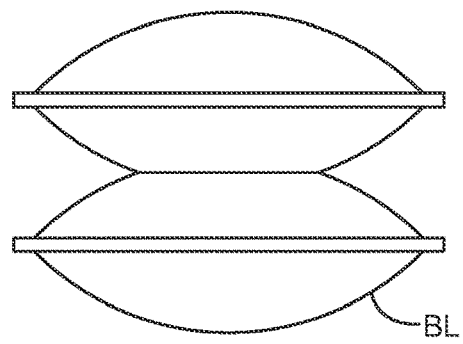
FIG. 14A
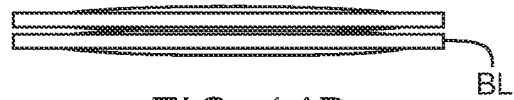
FIG. 14B
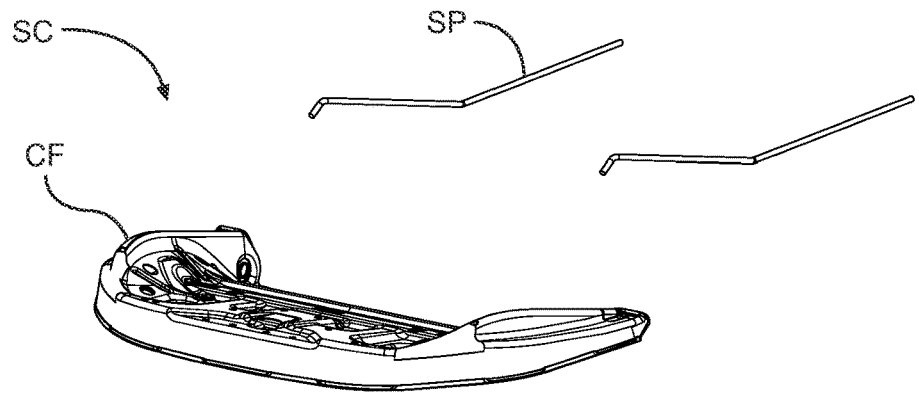
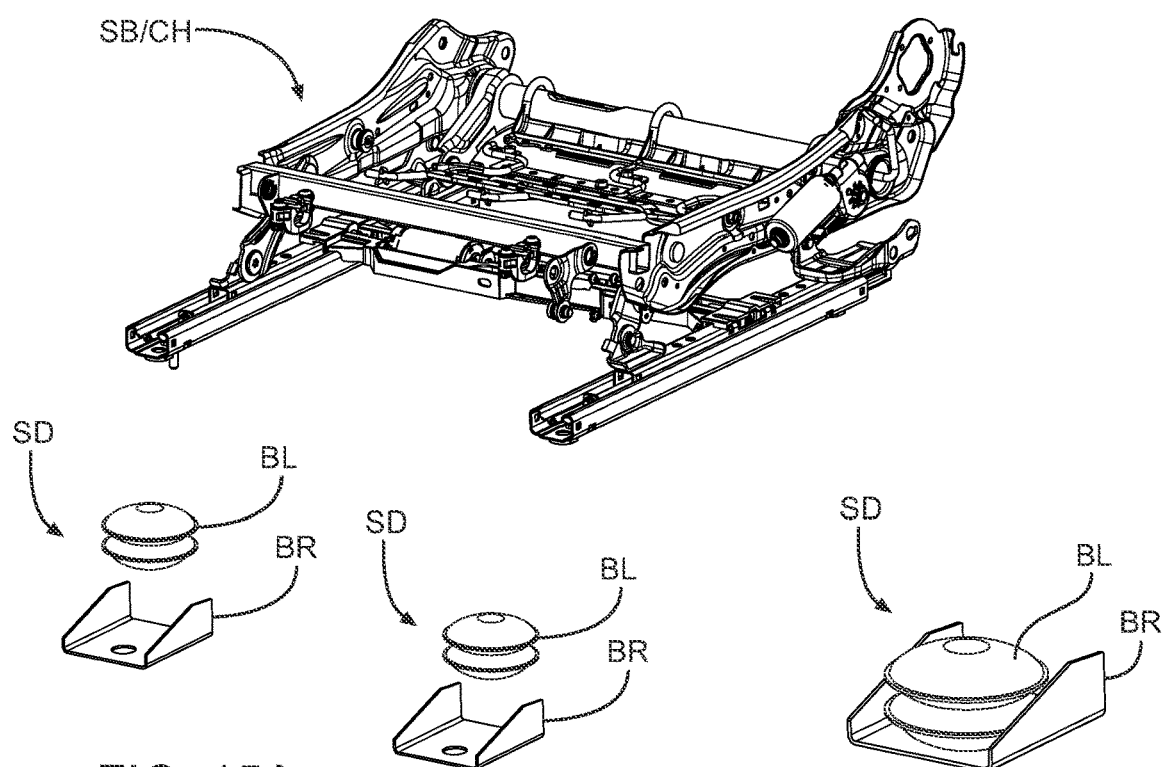
FIG. 15A
FIG. 15B

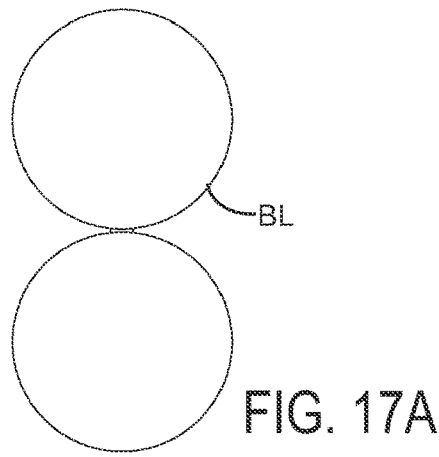
FIG. 17A
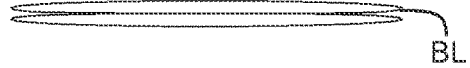
FIG. 17B
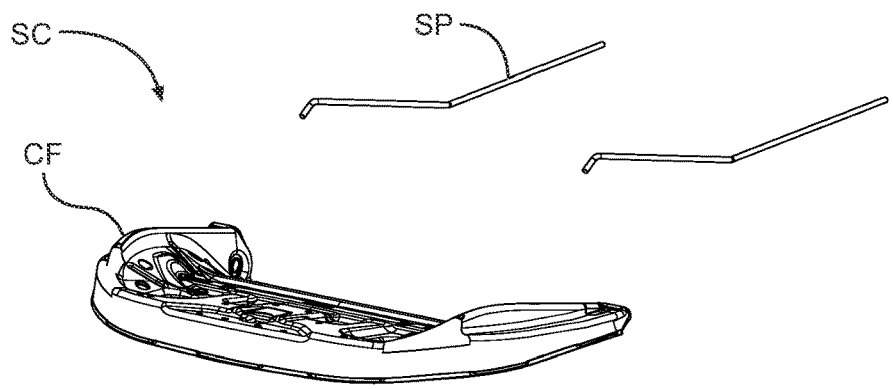
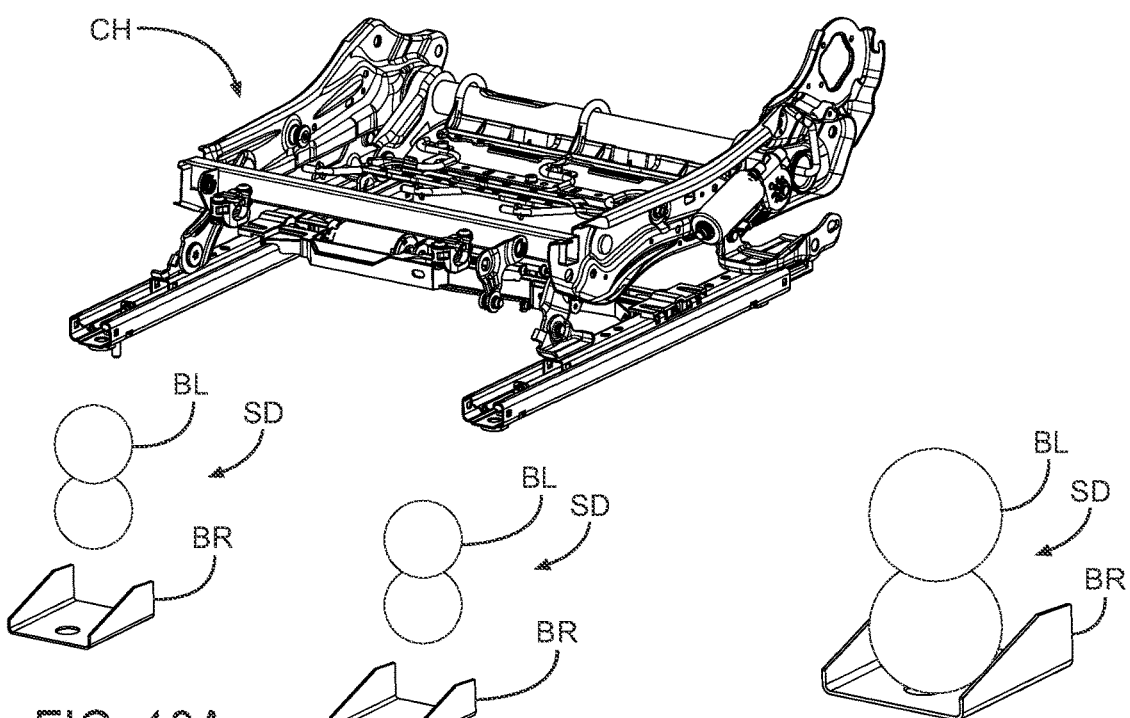
FIG. 18A
FIG. 18B

SEAT FOR VEHICLE

CROSS-REFERENCE TO RELATED APPLICATIONS

The present application is a continuation of PCT/International Patent Application No. PCT/US2023/83106 titled "SEAT FOR VEHICLE" filed Dec. 8, 2023, which claims the benefit of U.S. Provisional Patent Application No. 63/431,459 titled "SEAT FOR VEHICLE" filed Dec. 9, 2022.

The present application claims priority to and incorporates by reference in full the following patent applications: (a) U.S. Provisional Patent Application No. 63/431,459 titled "SEAT FOR VEHICLE" filed Dec. 9, 2022; (b) PCT/International Patent Application No. PCT/US2023/83106 titled "SEAT FOR VEHICLE" filed Dec. 8, 2023.

FIELD

The present invention relates to a seat for a vehicle.

BACKGROUND

It is known to provide a seat for a vehicle comprising a back assembly and a cushion assembly comprising a cushion frame configured to move between a raised position and a lowered position.

It would be advantageous to provide an improved seat with an improved cushion assembly.

SUMMARY

The present invention relates to a seat for a vehicle comprising a back assembly; a cushion assembly comprising a base frame and a cushion frame coupled to the base frame; and an adjustment mechanism configured to move the cushion frame relative to the base frame between a lowered position and a raised position. The adjustment mechanism may comprise a frame and an adjuster. The frame may comprise an interface comprising a dome-shaped seat for the adjuster. The seat may comprise an interface comprising a recess for the adjuster at the cushion frame. The frame may comprise an interface comprising a compliant element for the adjuster. The seat may comprise an actuator and a bladder for the adjustment mechanism; the actuator may be configured to inflate the bladder and to deflate the bladder. The adjustment mechanism may comprise at least one air bladder; the at least one air bladder may be configured to at least one of (a) expand to move the cushion frame; (b) contract to move the cushion frame. The at least one air bladder may comprise a right air bladder and a left air bladder; the right air bladder may be configured to move a right side of the cushion frame; the left air bladder may be configured to move a left side of the cushion frame; the right air bladder and the left air bladder may be configured to expand to move the cushion frame toward the raised position. One of the right air bladder and the left air bladder may be configured to expand and the other of the right air bladder and the left air bladder may be configured to remain fixed to tilt the cushion frame. The base frame may comprise a chassis; the chassis may comprise a bracket configured to support the at least one air bladder. The at least one air bladder may be positioned between the bracket and the cushion frame. The chassis may comprise a cross member; the bracket may be coupled to the cross member.

The present invention relates to a seat for a vehicle comprising a back assembly; a cushion assembly comprising a base frame and a cushion frame coupled to the base frame; an adjustment mechanism comprising an adjuster and configured to move the cushion frame relative to the base frame between a lowered position and a raised position; an interface between the adjuster and the cushion frame; and an interface comprising a recess for the adjuster at the cushion frame. The interface may comprise a stop of movement of the adjuster at the raised position. The cushion frame may comprise a back section and a front section movable to the raised position and the lowered position. The front section of the cushion frame may comprise an inward section and an outward section; the adjustment mechanism may be configured to move the inward section of the front section independently of the outward section; the adjustment mechanism may be configured to move the outward section of the front section independently of the inward section. The adjustment mechanism may comprise an inward adjuster and an outward adjuster. The adjustment mechanism may be configured to tilt the inward section of the front section independently by actuation of the inward adjuster of the adjustment mechanism. The adjustment mechanism may comprise a spring mechanism configured to bias the adjuster to move the cushion frame toward the lowered position. The adjustment mechanism may comprise at least one air bladder. The base frame may comprise a chassis; the chassis may comprise a cross member and a bracket configured to support the at least one air bladder; the bracket may be coupled to the cross member. The cushion frame may be configured to rotate relative to the chassis at a pivot.

The present invention relates to a seat for a vehicle comprising a back assembly; a cushion assembly comprising a base frame and a cushion frame coupled to the base frame; and an adjustment mechanism configured to move the cushion frame relative to the base frame between a lowered position and a raised position. The adjustment mechanism may comprise a pneumatic actuator. The base frame may comprise a chassis. The adjustment mechanism may be operated by a control panel. The adjustment mechanism may comprise an adjuster system. The adjustment mechanism may comprise an adjuster. The adjuster may comprise a bladder. The bladder may comprise at least one of (a) a membrane; (b) a chamber; (c) an airbag; (d) an inflatable bladder. The bladder may be configured to be inflated for the raised position and to be deflated for the lowered position; the bladder may be configured to be partially inflated for at least one intermediate position between the raised position and the lowered position. The bladder may comprise at least one of (a) a generally cylindrical-shaped form when inflated; (b) a disc-shaped form when inflated; (c) a multiple disc-shaped form; (d) a ball-shaped form when inflated; (e) a multiple ball-shaped form; (f) a bubble shape. The bladder may be configured to be generally flat when deflated. The seat may comprise an actuator and a bladder for the adjustment mechanism; the actuator may be configured to inflate the bladder and to deflate the bladder. The actuator may be configured by operation at a control panel to inflate the bladder and to deflate the bladder. The actuator may be coupled to the adjustment mechanism by a connector; the actuator may comprise a pneumatic actuator and the adjustment mechanism may comprise a bladder arrangement and the connector may comprise a tube. The adjustment mechanism may comprise an adjuster comprising a bladder system; the bladder system may comprise a multi-segment bladder; the multi-segment bladder may comprise a multi-chamber arrangement. The adjustment mechanism may comprise an adjuster comprising a bladder arrangement comprising at least two segments. The adjustment mechanism may comprise an adjuster comprising a generally expandable bladder inflatable by an actuator and deflatable by the actuator. The adjustment mechanism may comprise a frame and an adjuster. The frame may comprise an interface for the adjuster. The frame may comprise an interface comprising a compliant element for the adjuster. The frame may comprise an interface comprising a mount for the adjuster. The frame may comprise an interface comprising a dome-shaped seat for the adjuster. The frame may comprise a bracket. The bracket of the frame may comprise a mounting bracket. The adjustment mechanism may comprise an adjuster. The seat may comprise an interface between the adjuster and the cushion frame. The seat may comprise an interface comprising a compliant element for the adjuster and the cushion frame. The seat may comprise an interface comprising a recess for the adjuster at the cushion frame. The interface may comprise a stop of movement of the adjuster at the raised position; the stop may comprise at least one of (a) a mechanical stop; (b) the adjuster; (c) the bladder. The cushion frame may be pivotally coupled with the base frame. The cushion frame may comprise a back section and a front section movable to the raised position and the lowered position. The front section of the cushion frame may comprise an inward section and an outward section; the adjustment mechanism may be configured to move the inward section of the front section independently of the outward section; the adjustment mechanism may be configured to move the outward section of the front section independently of the inward section. The adjustment mechanism may comprise an inward adjuster and an outward adjuster. The adjustment mechanism may be configured to tilt the inward section of the front section independently by actuation of the inward adjuster of the adjustment mechanism. The adjustment mechanism may be configured to tilt the outward section of the front section independently by actuation of the outward adjuster of the adjustment mechanism. The adjustment mechanism may be configured to move the inward section of the front section independently by actuation of the inward adjuster of the adjustment mechanism and to move the inward section of the front section independently by actuation of the inward adjuster of the adjustment mechanism. The adjustment mechanism may be configured to move simultaneously the inward section of the front section by actuation of the inward adjuster of the adjustment mechanism and the inward section of the front section by actuation of the inward adjuster of the adjustment mechanism. The adjustment mechanism may comprise a set of adjusters comprising the inward adjuster and the outward adjuster; the inward adjuster may be separately operable and the outward adjuster may be separately operable. The adjustment mechanism may comprise a set of adjusters comprising the inward adjuster and the outward adjuster; the inward adjuster may be operable with the outward adjuster. The adjustment mechanism may comprise an adjuster. The adjuster may comprise a housing containing a bladder arrangement. The adjustment mechanism may comprise a spring mechanism configured to bias the adjuster to move the cushion frame toward the lowered position. The seat may comprise a controller; the controller may be configured to facilitate selective actuation of at least one pneumatic actuator to move the cushion frame. The seat may comprise a controller; the controller may be configured to facilitate selective actuation of at least one pneumatic actuator to move the cushion frame and to move at least one of (a) a lumbar support; (b) a head restraint; (c) a bolster. The controller may be operated by a control panel. The adjustment mechanism may comprise at least one air bladder; the at least one air bladder may be configured to at least one of (a) expand to move the cushion frame; (b) contract to move the cushion frame.

The present invention relates to a seat for a vehicle comprising a back assembly; a cushion assembly comprising a chassis and a cushion frame coupled to the chassis; and a mechanism configured to move the cushion frame relative to the chassis between a lowered position and a raised position. The mechanism may comprise at least one pneumatic actuator. The seat may comprise a controller; the controller may be configured to facilitate selective actuation of the at least one pneumatic actuator to move the cushion frame and move at least one of (a) a lumbar support; (b) a head restraint; (c) a bolster. The mechanism may be configured to expand an air bladder to move the cushion frame toward the raised position; the mechanism may be configured to contract the air bladder to move the cushion frame toward the lowered position. The mechanism may comprise at least one air bladder; the at least one air bladder may be configured to at least one of (a) expand to move the cushion frame; (b) contract to move the cushion frame. The at least one air bladder may comprise a right air bladder and a left air bladder; the right air bladder may be configured to move a right side of the cushion frame; the left air bladder may be configured to move a left side of the cushion frame; the right air bladder and the left air bladder are configured to expand to move the cushion frame toward the raised position. One of the right air bladder and the left air bladder may be configured to expand and the other of the right air bladder and the left air bladder may be configured to remain fixed to tilt the cushion frame. The chassis may comprise a bracket configured to support the at least one air bladder. The at least one air bladder may be positioned between the bracket and the cushion frame. The chassis may comprise a cross member; the bracket may be coupled to the cross member. The cushion frame may be configured to rotate relative to the chassis at a pivot. The seat may comprise a spring configured to bias the cushion frame toward the lowered position. The spring may comprise a rear portion coupled to the chassis and a front portion coupled to the cushion frame.

The present invention relates to a seat for a vehicle comprising a back assembly, a cushion assembly comprising a chassis and a cushion frame coupled to the chassis, and a mechanism configured to move the cushion frame relative to the chassis between a lowered position and a raised position. The mechanism may comprise at least one pneumatic actuator. The at least one pneumatic actuator may be configured to actuate movement of at least one of (a) a lumbar support; (b) a head restraint; (c) a bolster. The seat may comprise a controller; the controller may be configured to facilitate selective actuation of the at least one pneumatic actuator to move the cushion frame and move at least one of (a) a lumbar support; (b) a head restraint; (c) a bolster. The mechanism may comprise at least one pump and at least one valve. The mechanism may be configured to expand an air bladder to move the cushion frame toward the raised position; the mechanism may be configured to contract the air bladder to move the cushion frame toward the lowered position. The mechanism may comprise at least one air bladder. The at least one air bladder may be configured to at least one of (a) expand to move the cushion frame; (b) contract to move the cushion frame. The at least one air bladder may comprise a right air bladder and a left air bladder. The right air bladder may be configured to move a right side of the cushion frame; the left air bladder may be configured to move a left side of the cushion frame. The right air bladder and the left air bladder may be configured to expand to move the cushion frame toward the raised position. One of the right air bladder and the left air bladder may be configured to expand and the other of the right air bladder and the left air bladder may be configured to remain fixed to tilt the cushion frame. The chassis may comprise a bracket configured to support the at least one air bladder. The at least one air bladder may be positioned between the bracket and the cushion frame. The chassis may comprise a crossmember; the bracket may be coupled to the cross member. The cushion frame may be configured to rotate relative to the chassis at a pivot. The seat may comprise a spring configured to bias the cushion frame toward the lowered position. The spring may comprise a rear portion coupled to the chassis and a front portion coupled to the cushion frame. The spring may comprise a wire.

FIGURES

FIG. 1A is a schematic perspective view of a vehicle according to an exemplary embodiment.

FIG. 1B is a schematic perspective cut-away view of a vehicle showing a vehicle interior according to an exemplary embodiment.

FIGS. 2A and 2B are schematic composite views of a seat for a vehicle according to an exemplary embodiment.

FIG. 6A is a schematic partial side view of a seat according to an exemplary embodiment.

FIG. 6B is a schematic cutaway side view of a seat cushion adjuster according to an exemplary embodiment.

FIG. 6C is a schematic partial front view of a seat according to an exemplary embodiment.

FIG. 7A is a schematic partial side view of a seat according to an exemplary embodiment.

FIG. 7B is a schematic cutaway side view of a seat cushion adjuster according to an exemplary embodiment.

FIG. 7C is a schematic partial front view of a seat according to an exemplary embodiment.

FIGS. 14A and 14B are schematic front views of a bladder for a seat according to an exemplary embodiment.

FIG. 15A is a schematic partial exploded perspective view of a seat according to an exemplary embodiment.

FIG. 15B is a schematic partial perspective view of a seat cushion adjuster according to an exemplary embodiment.

FIGS. 17A and 17B are schematic front views of a bladder for a seat according to an exemplary embodiment.

FIG. 18A is a schematic partial exploded perspective view of a seat according to an exemplary embodiment.

FIG. 18B is a schematic partial perspective view of a seat cushion adjuster according to an exemplary embodiment.

DESCRIPTION

Figure 3:
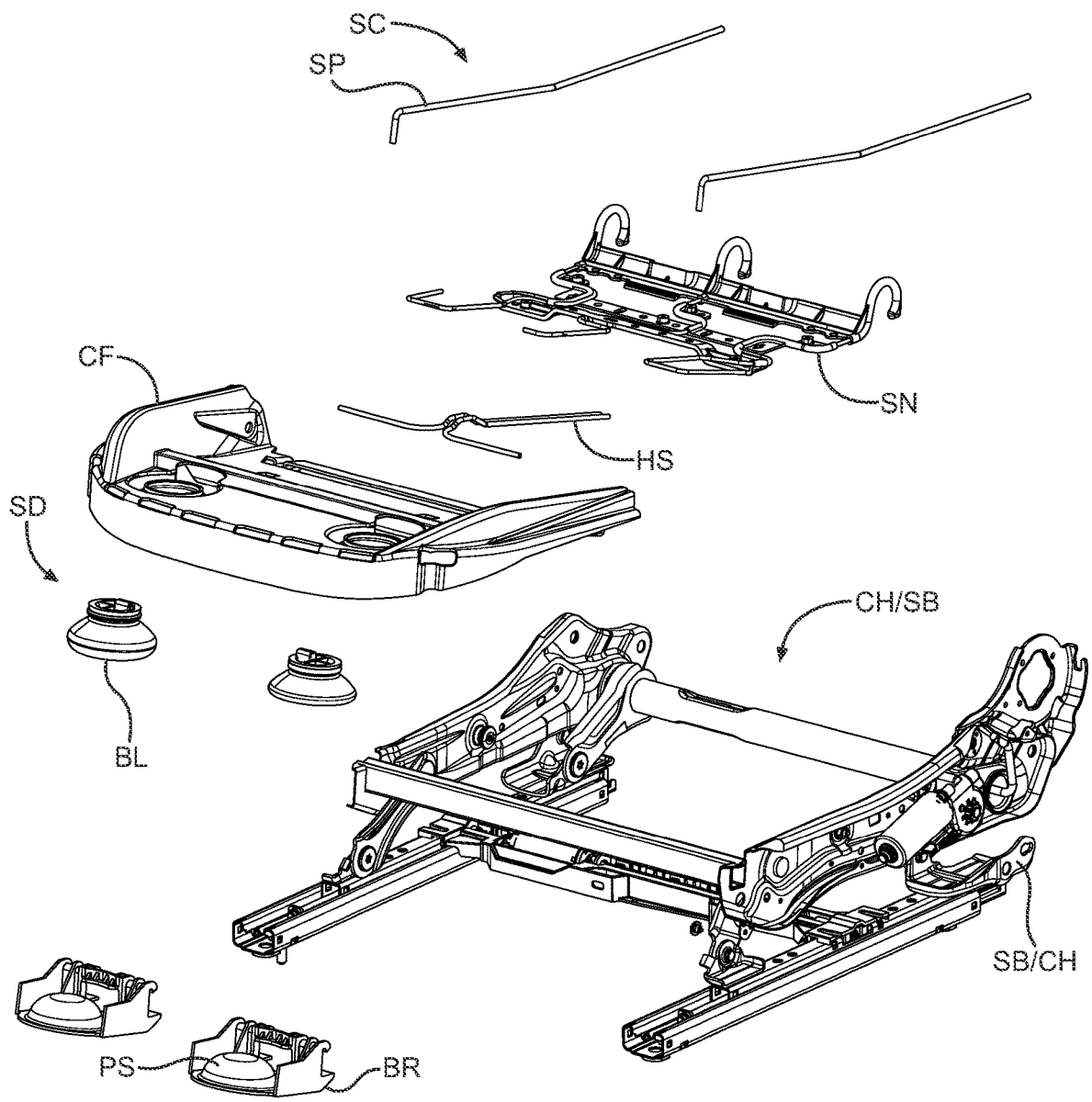
FIG. 3 is a schematic partial exploded perspective view of a seat according to an exemplary embodiment.
Figure 3A:
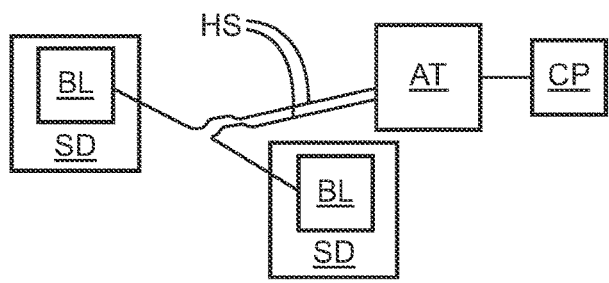
FIG. 3A is a schematic block diagram of a seat according to an exemplary embodiment.
Figure 3B:
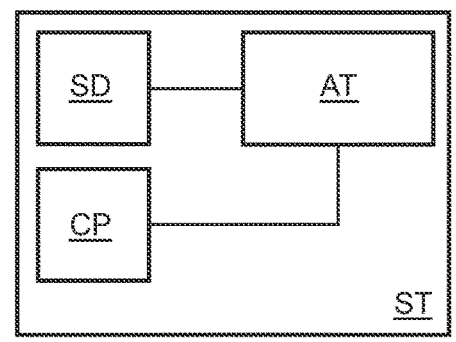
FIG. 3B is a schematic block diagram of a seat according to an exemplary embodiment.
Figure 4A:
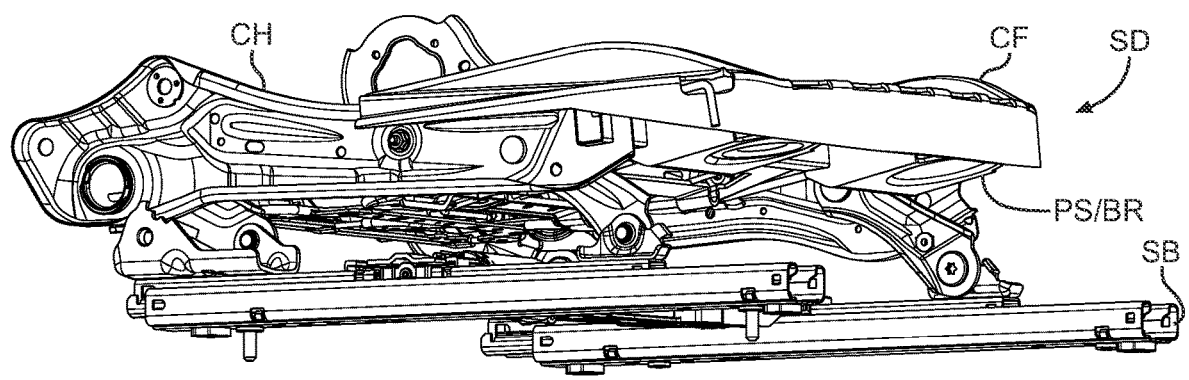
FIG. 4A is a schematic partial perspective view of a seat according to an exemplary embodiment.
Figure 4B:
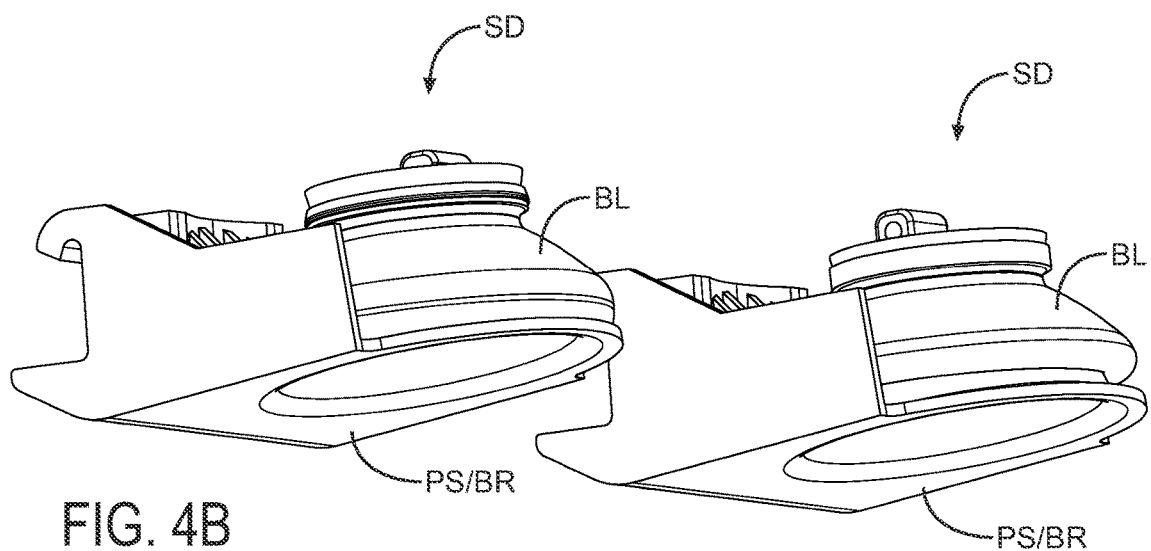
FIG. 4B is a schematic partial perspective view of a seat cushion adjuster according to an exemplary embodiment.
Figure 5A:
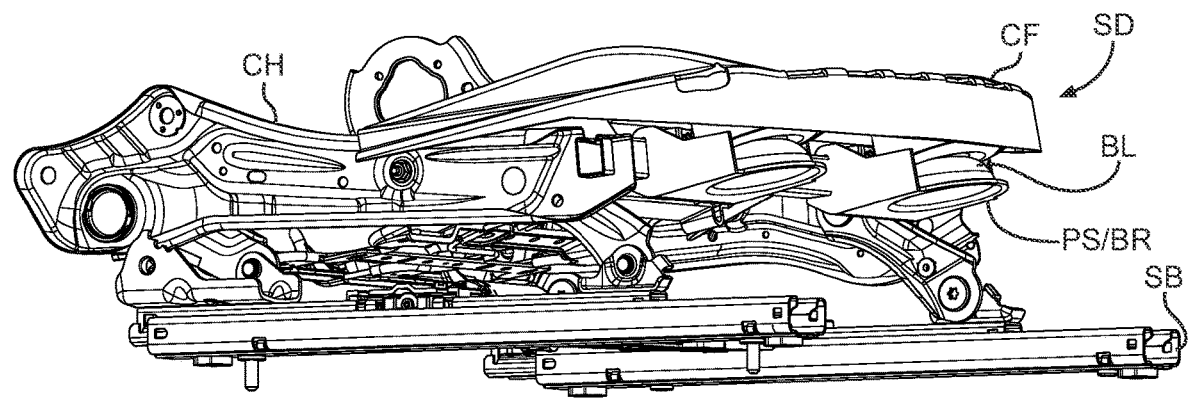
FIG. 5A is a schematic partial perspective view of a seat according to an exemplary embodiment.
Figure 5B:
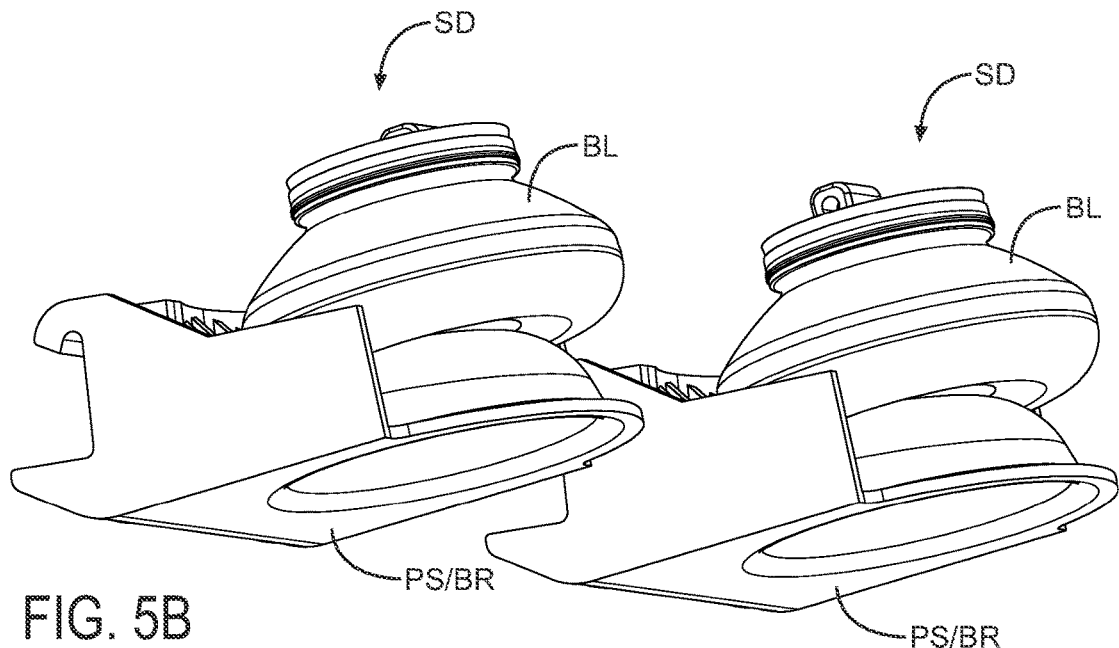
FIG. 5B is a schematic partial perspective view of a seat cushion adjuster according to an exemplary embodiment.
Figure 8A:
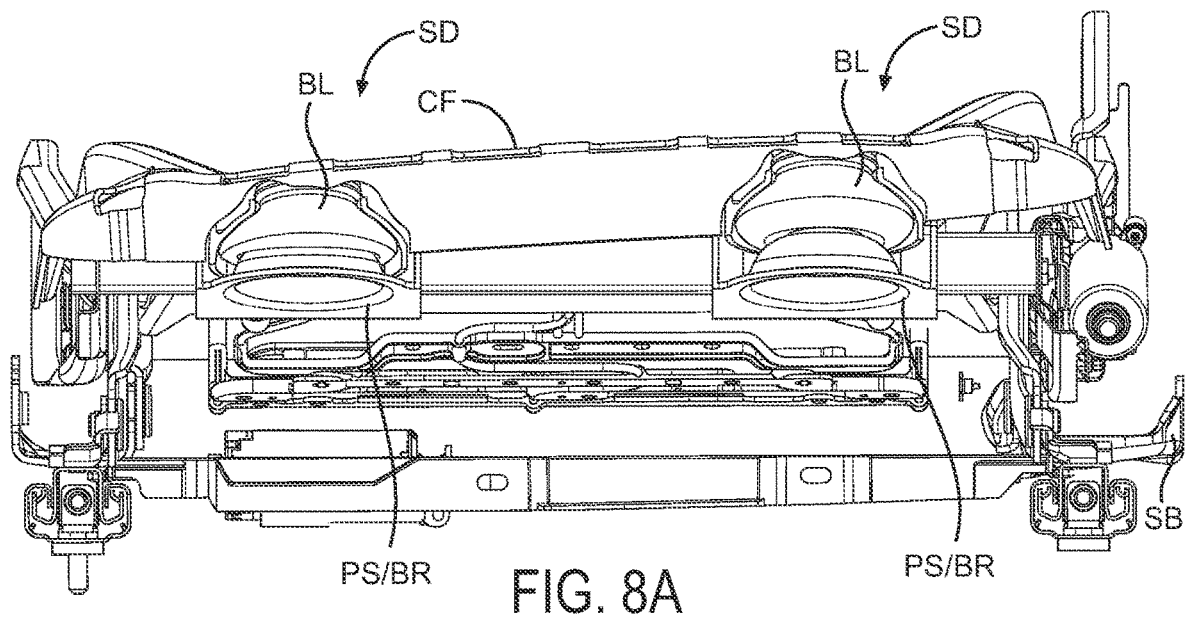
FIG. 8A is a schematic partial front view of a seat according to an exemplary embodiment.
Figure 8B:
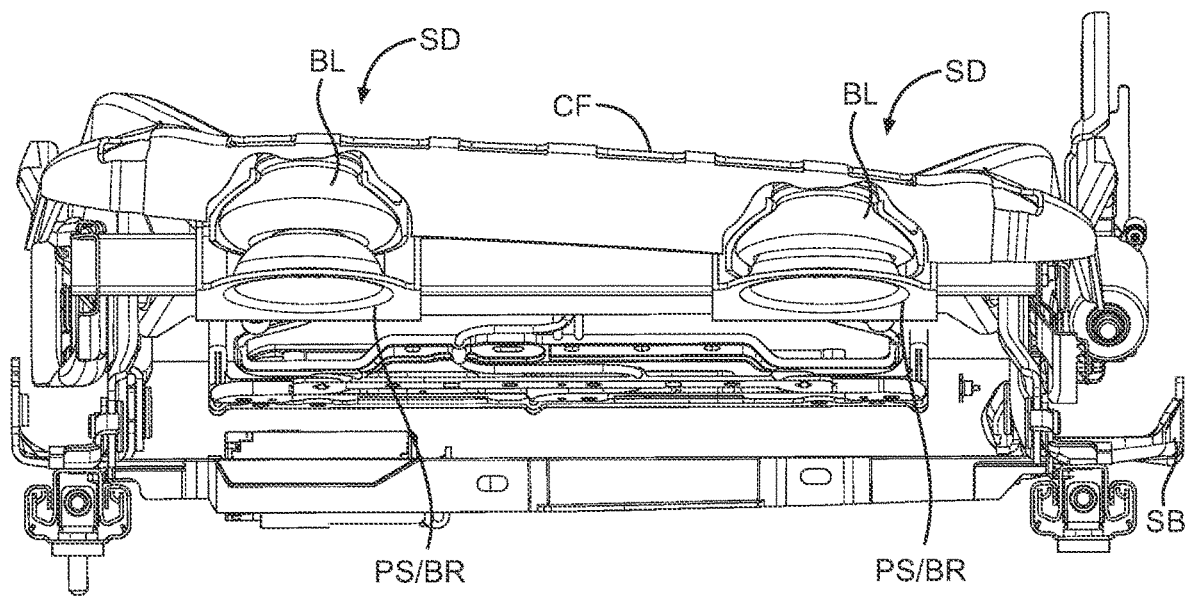
FIG. 8B is a schematic partial front view of a seat according to an exemplary embodiment.
Figure 9A:
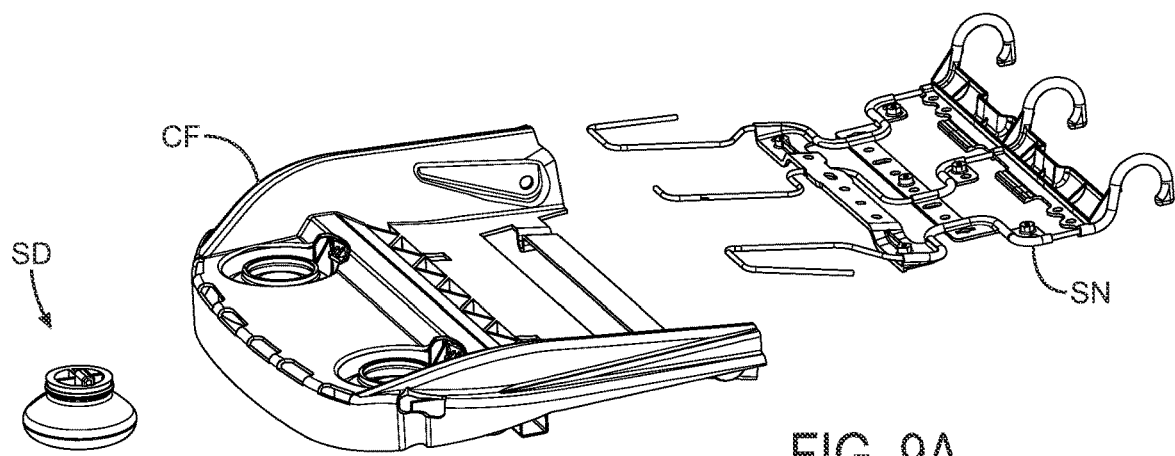
FIGS. 9A through 9C and 10A through 10C are schematic perspective views of a process to manufacture a seat according to an exemplary embodiment.
Figure 9B:
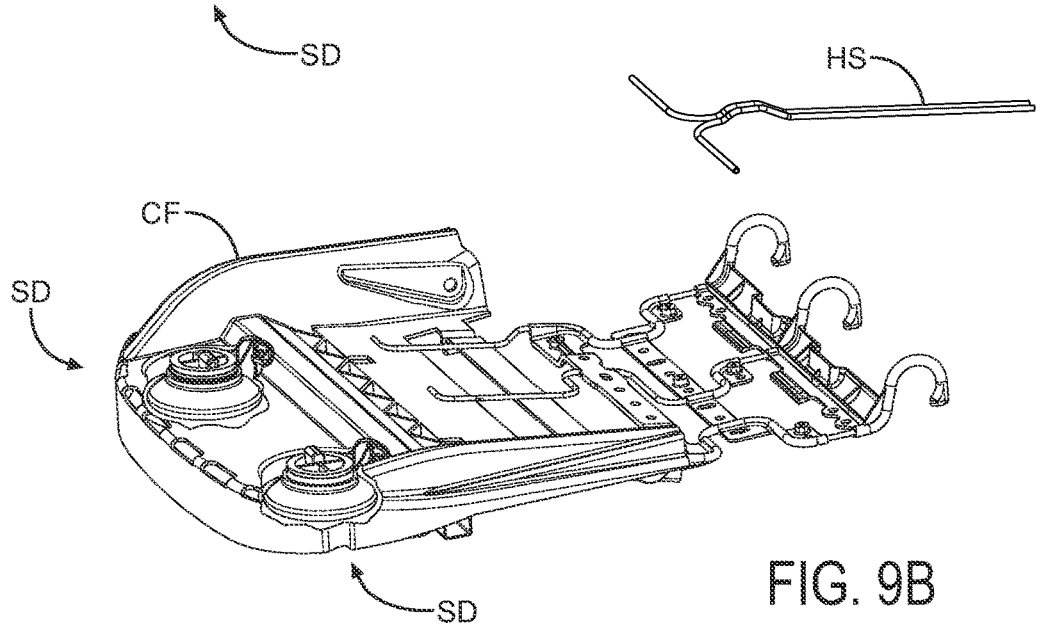
Figure 9C:
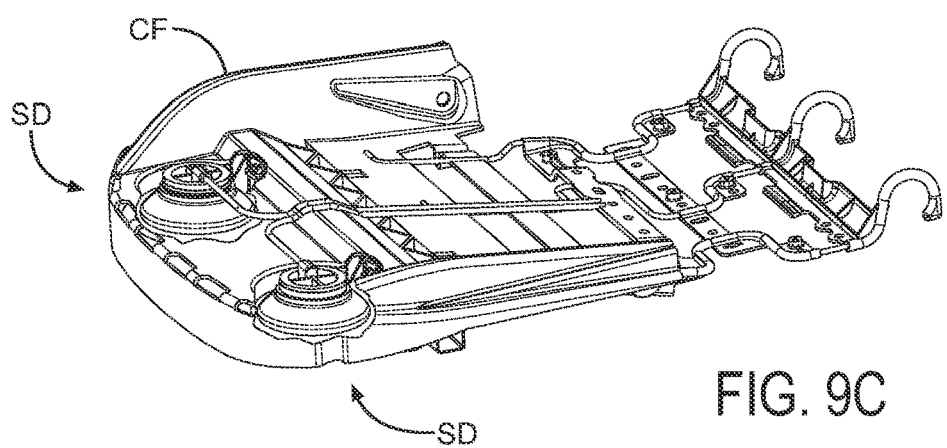
Figure 10A:
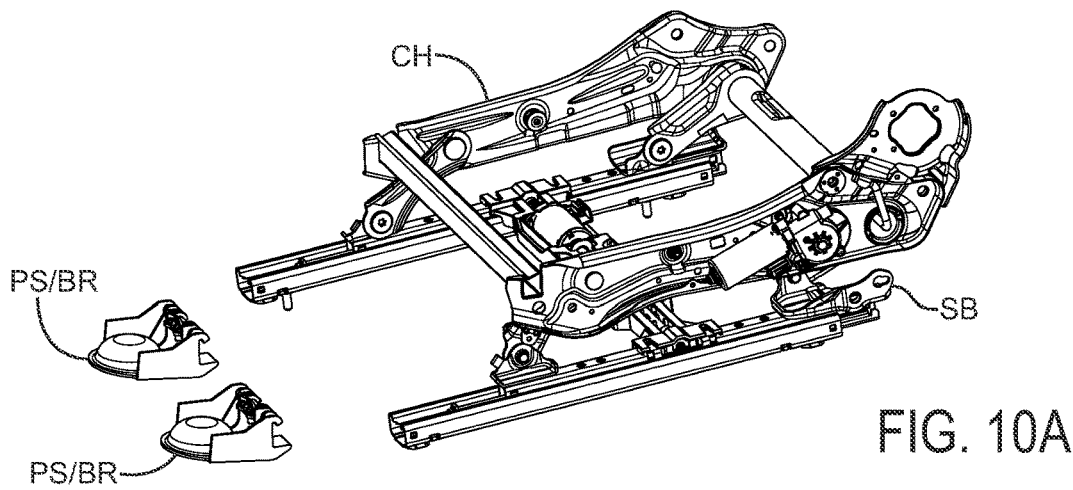
Figure 10B:
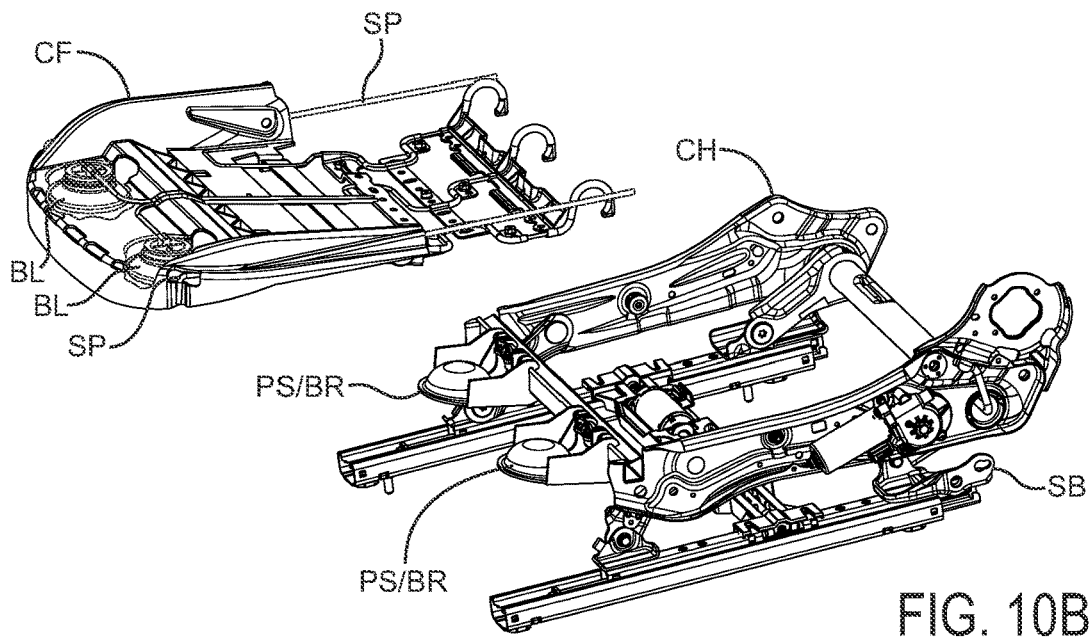
Figure 10C:
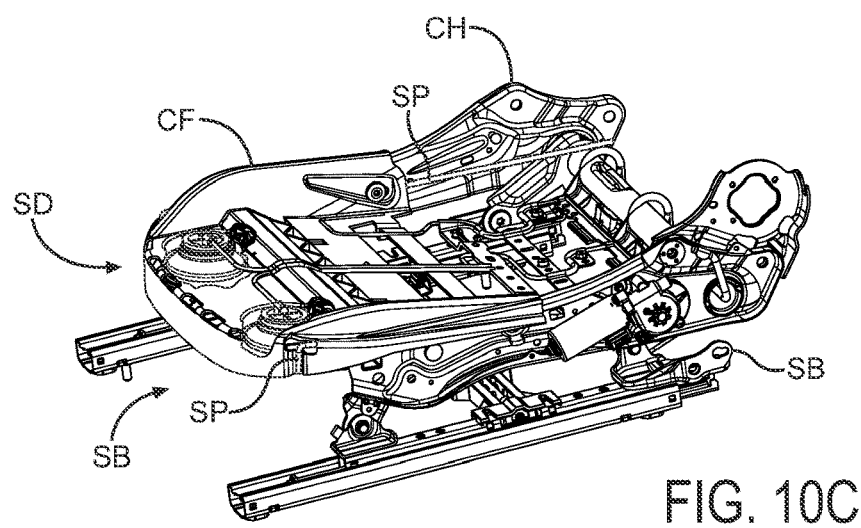
Figure 11:
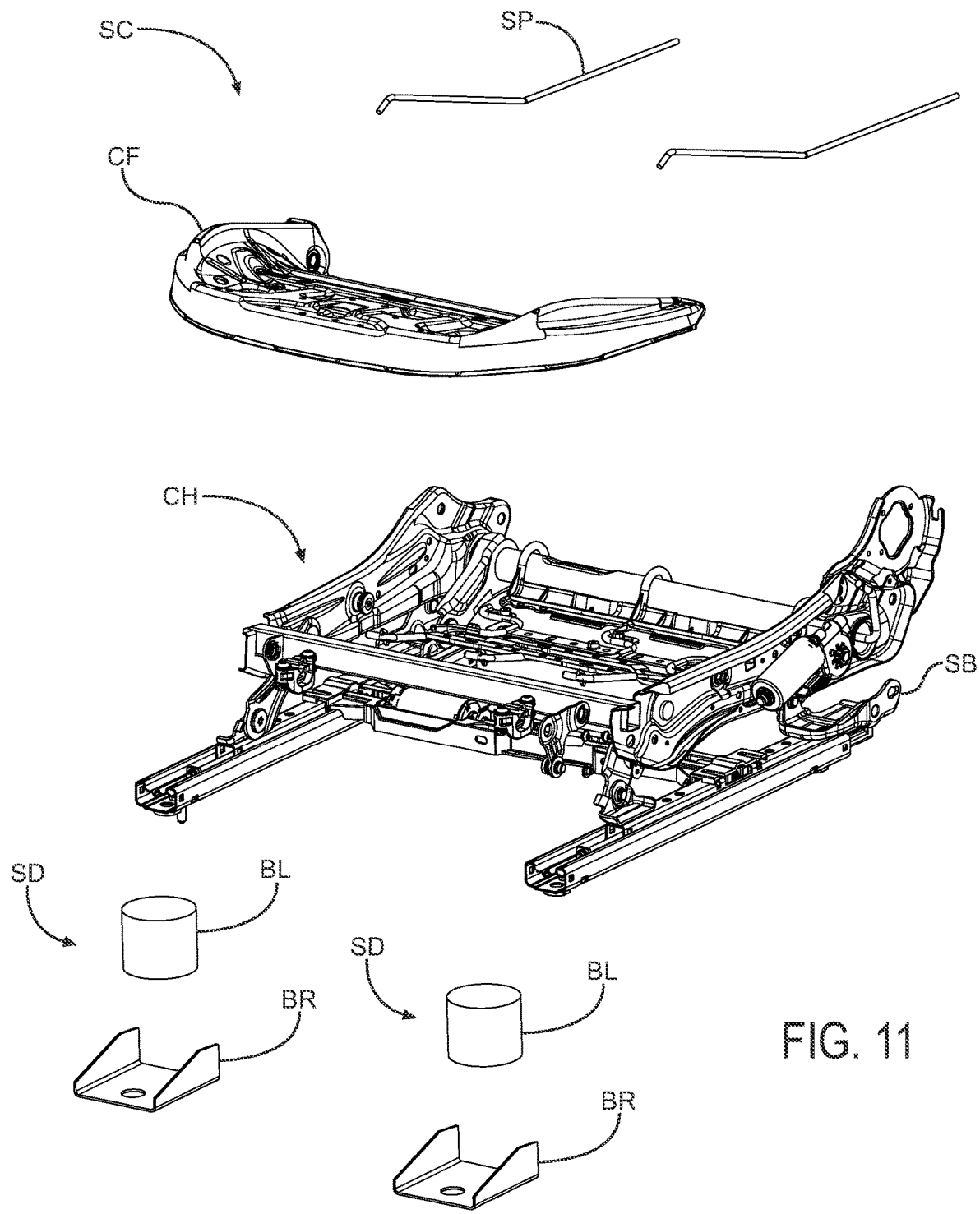
FIG. 11 is a schematic partial exploded perspective view of a seat according to an exemplary embodiment.
Figure 12A:
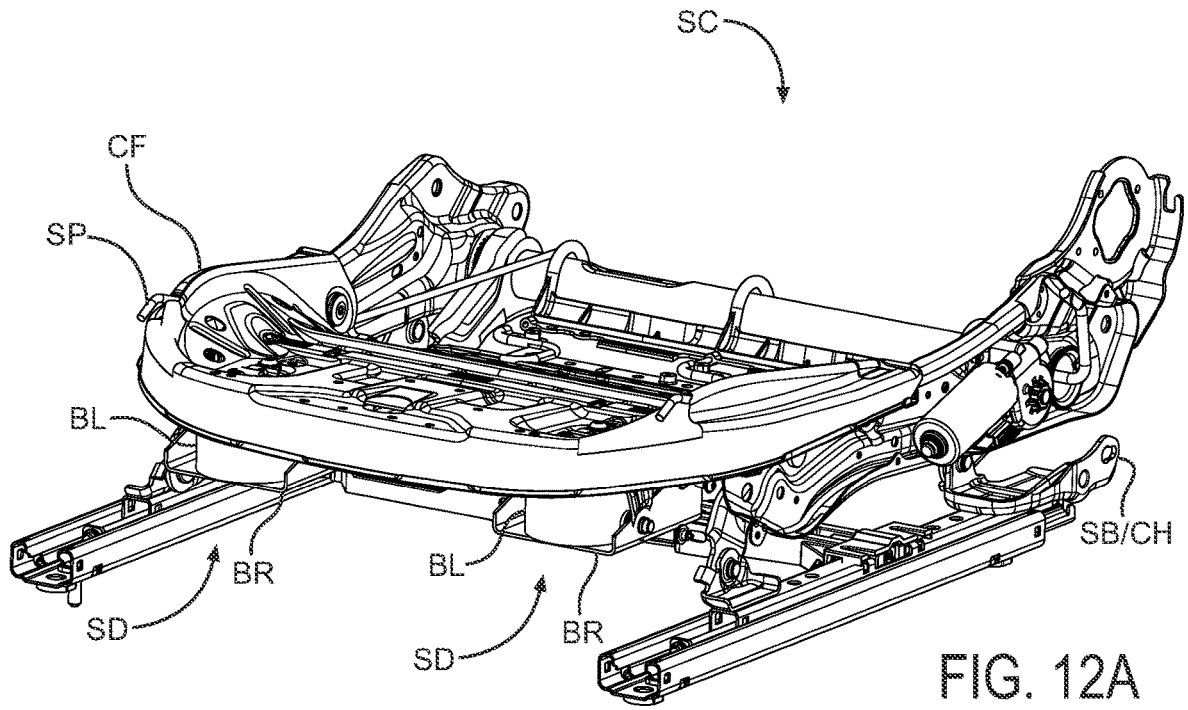
FIGS. 12A and 12B are schematic partial perspective views of a seat for a vehicle according to an exemplary embodiment.
Figure 12B:
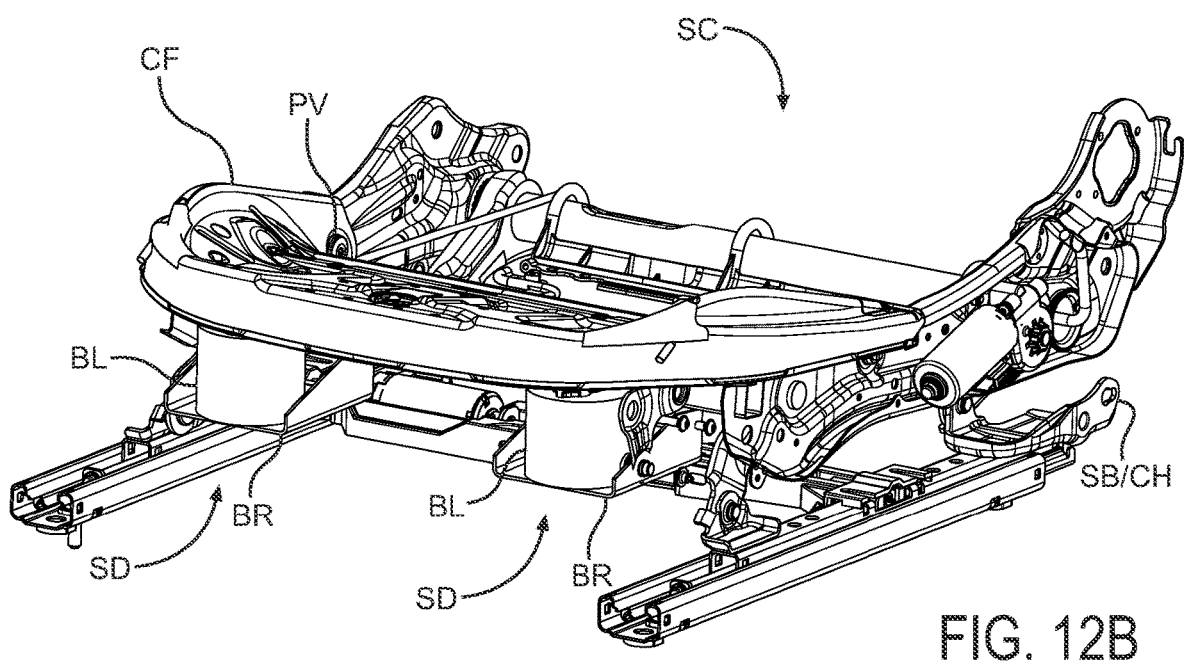
Figure 13A:
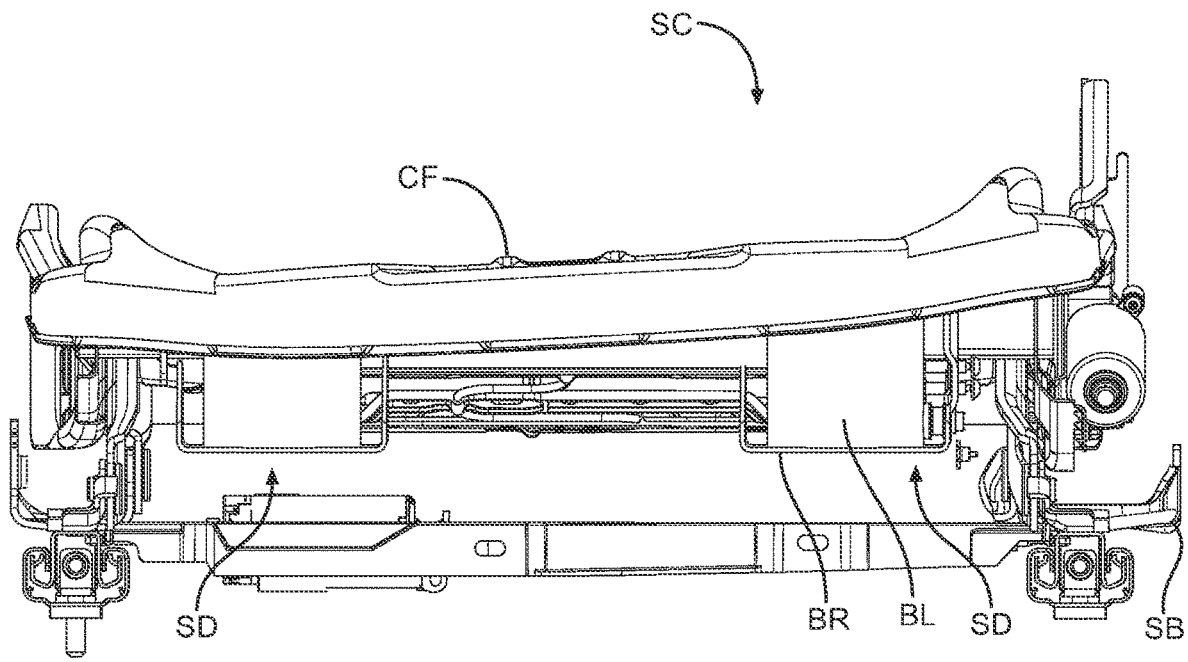
FIGS. 13A and 13B are schematic partial front views of a seat for a vehicle according to an exemplary embodiment.
Figure 13B:
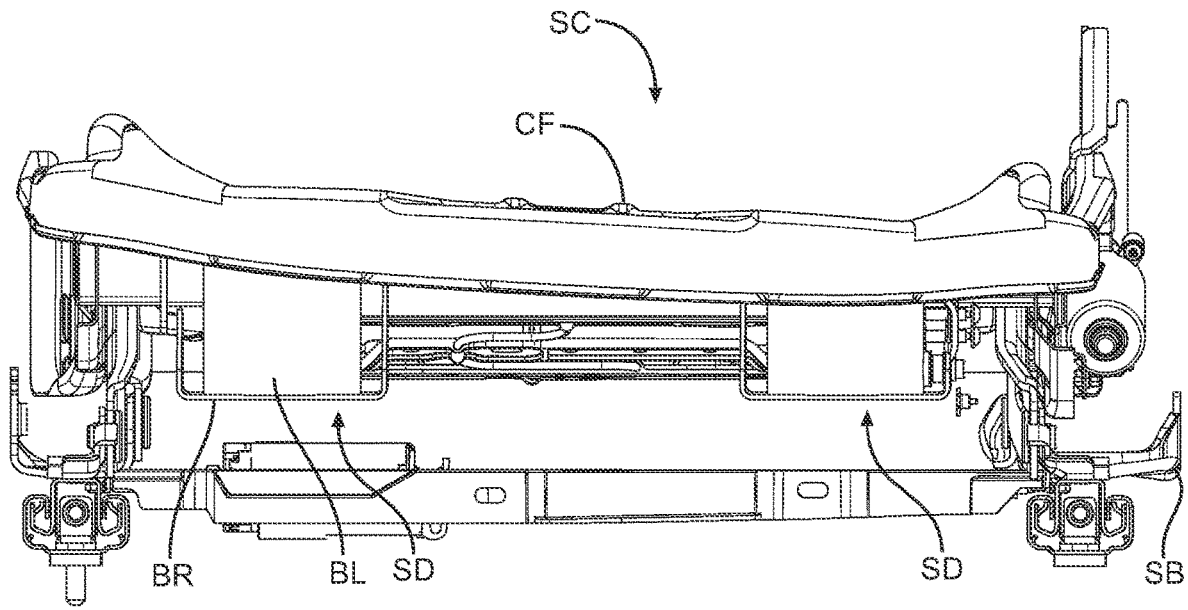
Figure 16A:
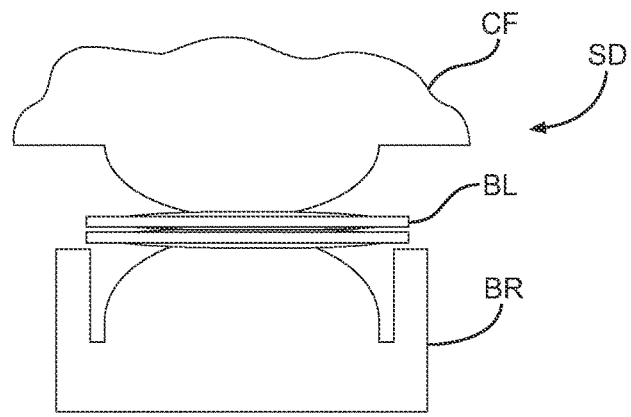
FIGS. 16A through 16C are schematic partial front views of a seat cushion adjuster according to an exemplary embodiment.
Figure 16B:
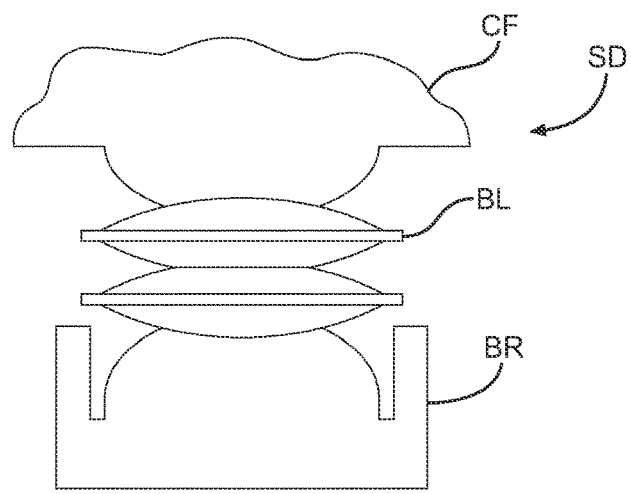
Figure 16C:
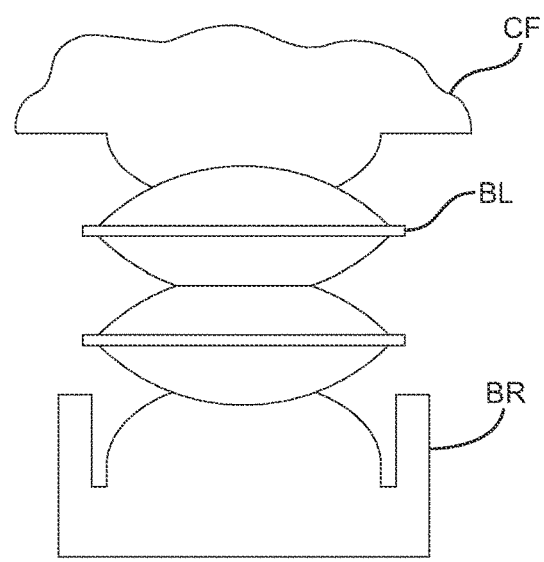
Figure 19A:
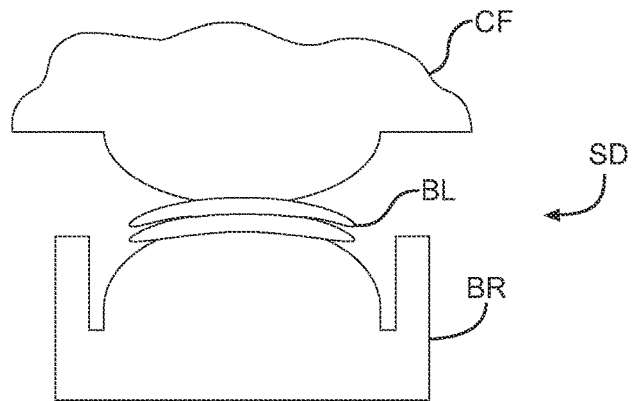
FIGS. 19A through 19C are schematic partial front views of a seat cushion adjuster according to an exemplary embodiment.
Figure 19B:
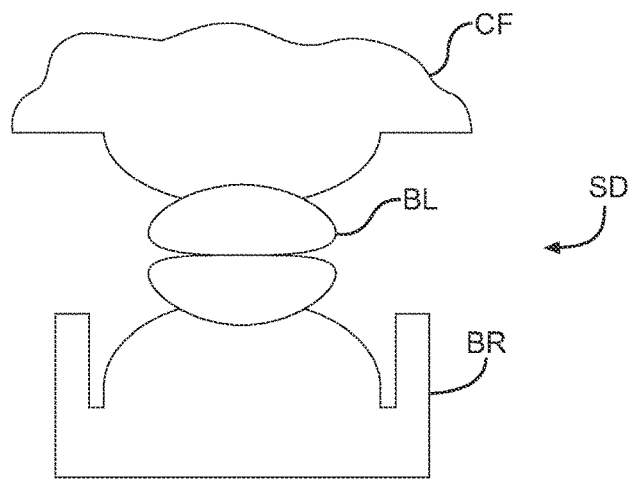
Figure 19C:
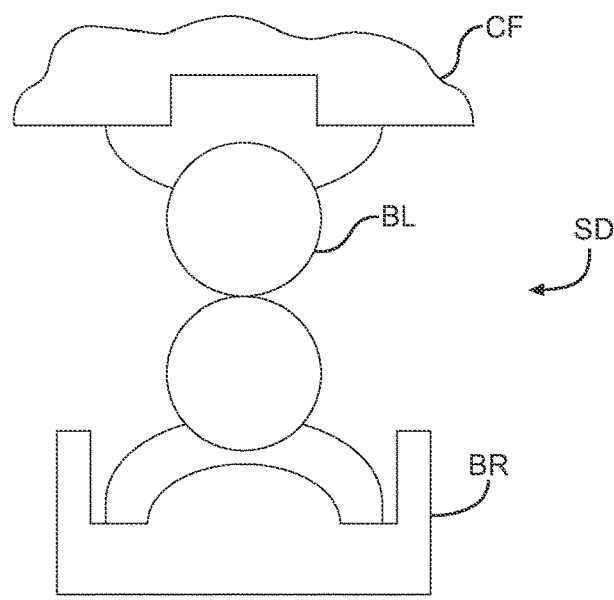
Figure 20:
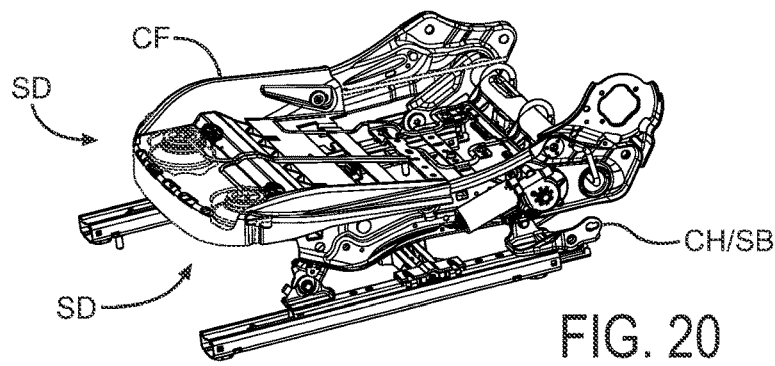
FIG. 20 is a schematic partial perspective view of a seat according to an exemplary embodiment.
Figure 21A:
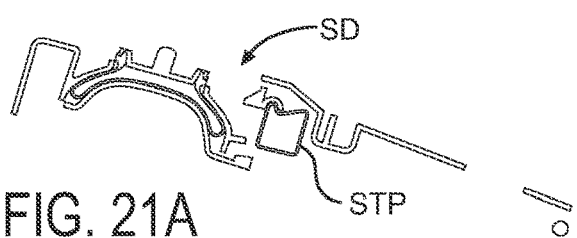
FIGS. 21A through 21C are schematic partial section views of a seat cushion adjuster according to an exemplary embodiment.
Figure 22A:
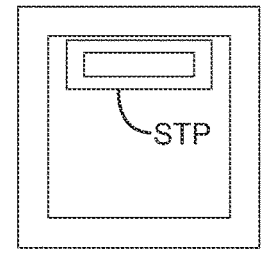
FIGS. 22A through 22C are schematic block diagrams of a seat according to an exemplary embodiment.
Figure 21B:
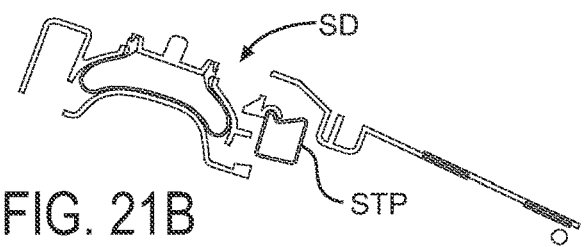
Figure 22B:
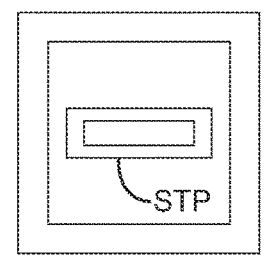
Figure 21C:
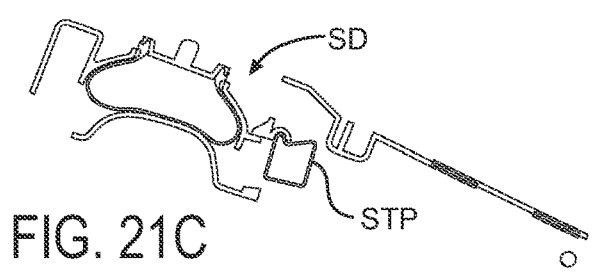
Figure 22C:
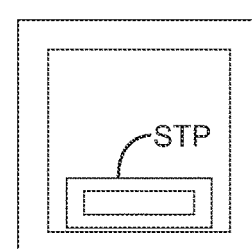
Figure 23:
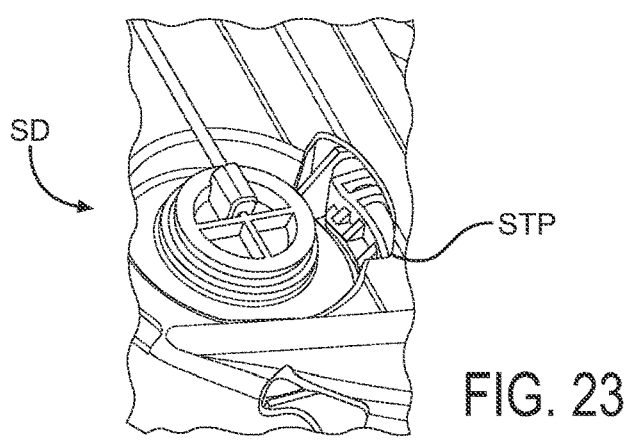
FIG. 23 is a schematic cutaway view of a seat according to an exemplary embodiment.
Figure 24:
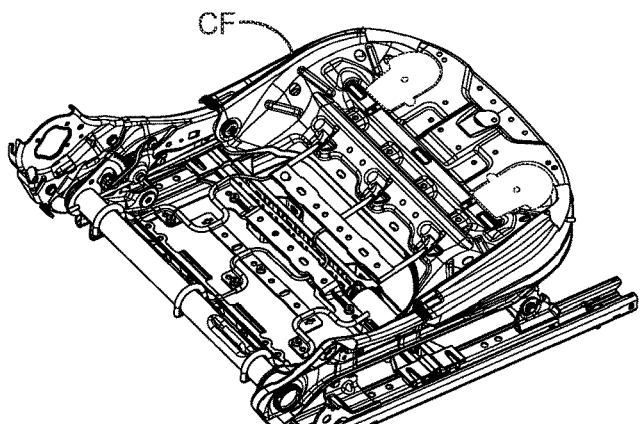
FIG. 24 is a schematic partial perspective view of a seat according to an exemplary embodiment.
Figure 25:
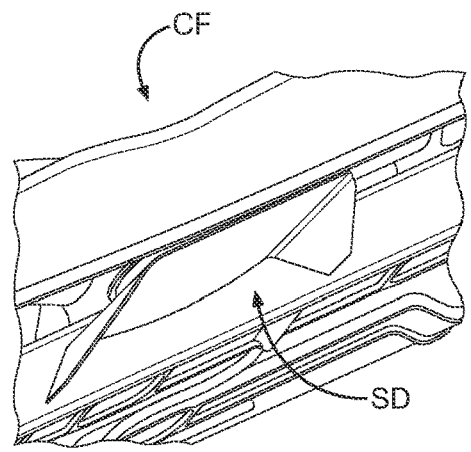
FIG. 25 is a schematic cutaway view of a seat according to an exemplary embodiment.
Figure 26A:
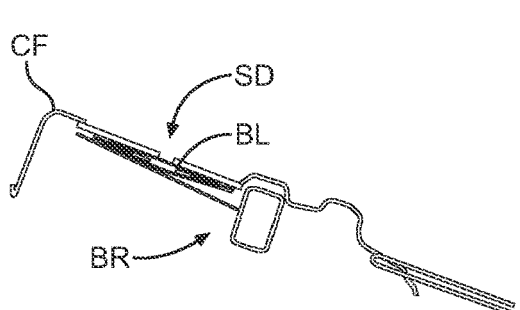
FIGS. 26A and 26B are schematic partial section views of a seat cushion adjuster according to an exemplary embodiment.
Figure 26B:
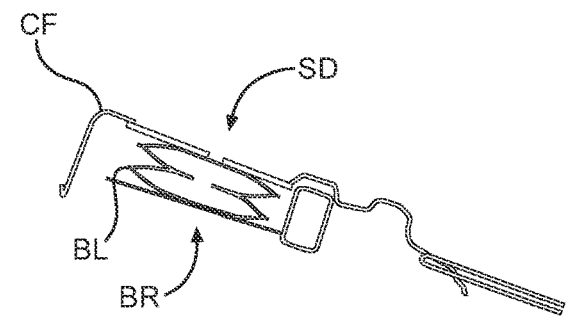
Figure 27A:
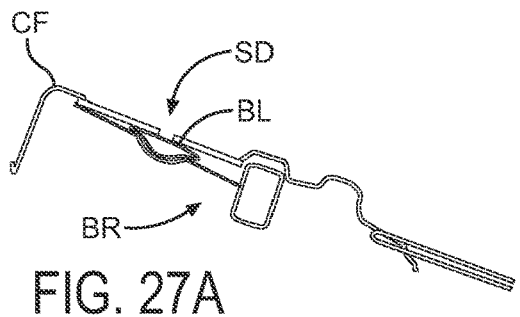
FIGS. 27A and 27B are schematic partial section views of a seat cushion adjuster according to an exemplary embodiment.
Figure 27B:
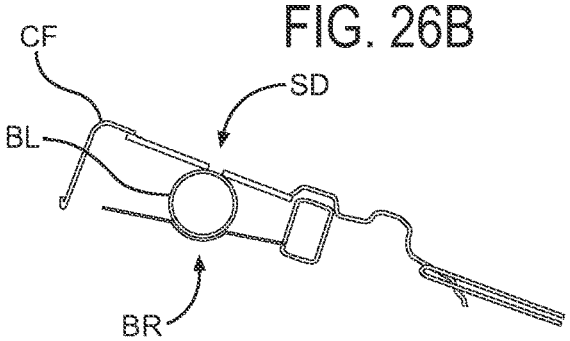
Figure 28A:
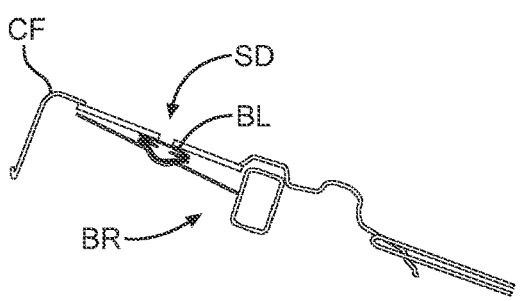
FIGS. 28A and 28B are schematic partial section views of a seat cushion adjuster according to an exemplary embodiment.
Figure 28B:
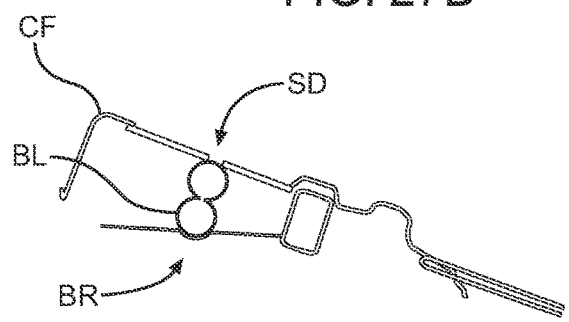

Referring to FIGS. 1A and 1B, a vehicle V is shown with an interior I comprising components such as seats including front seats ST (e.g. for operator and passenger).

As shown schematically in FIGS. 2A-2B, 3 and 3A-3B, seat ST may comprise a back assembly SK and a cushion assembly SC comprising a base frame SB and a cushion frame CF coupled to a chassis CH with suspension SN and an adjustment mechanism SD configured to move cushion frame CF relative to base frame SB between a lowered position (FIG. 2A) and a raised position (FIG. 2B). As indicated schematically in FIGS. 2A-2B and 3A-3B, adjustment mechanism SD may comprise an adjuster BL and an actuator AT operated by a control panel CP. As indicated schematically in FIGS. 2A-2B, 3, 3A, 4A-4B, 5A-5B, 6A-6C, 7A-7C, 8A-8B, 9A-9C, 10A-10C, 11, 12A-12B and 13A-13B, the adjuster may comprise a bladder BL configured to be deflated for the lowered position (FIGS. 2A and 6A-6C) and moved/inflated for the raised position (FIGS. 2B and 7A-7C); actuator AT may comprise a pneumatic actuator. See also FIGS. 14A-14B, 15A-15B, 16A-16C, 19A-19B, 21A-21C, 26A-26B, 27A-27B and 28A-28B.

As indicated schematically in FIGS. 2A-2B, 3, 4A-4B, 5A-5B, 6A-6C, 7A-7C and 12A-12B, cushion frame CF may be pivotally coupled at a pivot joint PV with base frame SB and may comprise a front section and a back section; the front section may comprise an inward section and an outward section. As indicated schematically in FIGS. 3, 4A-4B, 5A-5B 6A-6C, 7A-7C, 11, 12A-12B, 13A-13B, 14A-14B and 15A-15B, adjustment mechanism SD may comprise a set of adjusters BL configured to move the inward section independently of the outward section.

As indicated schematically in FIGS. 2A-2B, 3 and 3A-3B, adjustment mechanism SD may be operated by a control panel CP; adjustment mechanism SD may comprise an adjuster system; adjustment mechanism SD may comprise an adjuster system comprising at least one adjuster BL. See also FIGS. 3, 3A, 4A-4B, 5A-5B, 6A-6C, 7A-7C, 8A-8B, 9A-9C, 10A-10C, 11, 12A-12B, 13A-13B,14A-14B, 15A-15B, 16A-16C, 19A-19B, 20, 21A-21C, 23, 24, 25, 26A-26B, 27A-27B and 28A-28B.

As indicated schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 16A-16C and 19A-19B, adjustment mechanism SD may comprise an adjuster system comprising a set of adjusters BL; adjustment mechanism SD may comprise an adjuster BL. As indicated schematically in FIGS. 16A-16C, 19A-19C, 26A-26B and 28A-28B, adjuster BL may comprise a bladder system comprising a bladder such as multi-segment bladder; adjuster BL may comprise a bladder comprising at least two segments. As indicated schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 16A-16C, 19A-19B, 20, 21A-21C, 23, 24, 25, 26A-26B, 27A-27B and 28A-28B, adjuster BL may comprise a bladder arrangement; the adjuster may comprise a bladder arrangement comprising at least two segments. As indicated schematically in FIGS. 16A-16C, 19A-19B, 20, 21A-21C, 23, 24, 25, 26A-26B, 27A-27B and 28A-28B, adjuster BL shown as a bladder may comprise a membrane; the bladder may comprise a chamber; the bladder may comprise an airbag; the bladder may comprise an inflatable bladder; the bladder may comprise a bladder that may be inflatable and deflatable; the bladder may be configured to be inflated for the raised position and to be deflated for the lowered position. See also FIGS. 2A-2B.

As indicated schematically in FIGS. 3A-3B, 16A-16C and 19A-19C, the adjuster shown as bladder BL may be configured to be partially actuated/inflated for an intermediate position between the raised position and the lowered position; bladder BL may be configured to be partially inflated for at least one intermediate position between the raised position and the lowered position; actuator AT may be configured to inflate the bladder and to deflate the bladder; actuator AT may be configured by operation at a control panel CP to inflate the bladder and to deflate the bladder; actuator AT may be coupled to adjustment mechanism SD by a connector HS; actuator AT may comprise a pneumatic actuator and adjustment mechanism SD may comprise a bladder arrangement BL and the connector may comprise a pneumatic hose HS; actuator AT may comprise a pneumatic actuator and adjustment mechanism SD may comprise a bladder arrangement BL and the connector may comprise a tube HS.

As indicated schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 20 and 24, the seat may comprise structure/structures configured for functions relating to occupant positioning, anti-submarine configuration, impact transmission, etc.; base frame SB may be configured to mount a bracket PS/BR of adjustment mechanism SD; adjuster BL of adjustment mechanism SP may be coupled to bracket BR; adjuster BL may be positioned between bracket BR and cushion frame CF; the base frame may comprise a cross member; the bracket may be coupled to the cross member.

As indicated schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 16A-16C, 19A-19B, 20, 21A-21C, 23, 24, 25, 26A-26B, 27A-27B and 28A-28B, adjustment mechanism SD may comprise a frame BR; frame BR may comprise an interface for adjuster BL; frame BR may comprise an interface comprising a compliant element shown as a member/arm for adjuster BL (FIGS. 26A-26B, 27A-27B, 28A-28B); frame BR may comprise an interface comprising a seat such as a dome-shaped seat for adjuster BL (FIG. 3); the frame may comprise a bracket BR. As indicated schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 16A-16C, 19A-19B, 20, 21A-21C, 23, 24, 25, 26A-26B, 27A-27B and 28A-28B, the bracket of the frame may comprise a mounting bracket BR; bracket BR may comprise a compliant member with an interface between adjuster BL and cushion frame CF; the interface may comprise a compliant member/element BR for adjuster BL and cushion frame CF; the interface may comprise a recess for adjuster BL at cushion frame CF (FIGS. 3, 4A-4B); the interface may comprise an interface comprising a recess for the adjuster in the cushion frame.

As indicated schematically in FIGS. 20, 21A-21C, 22A-22C and 23, adjustment mechanism SD with interface may comprise a stop STP for movement of adjuster BL at the raised position; the stop may comprise a mechanical stop; the stop may comprise the bladder; the stop may comprise the mechanical stop and/or the bladder; the interface may comprise a stop for movement of the adjuster at the lower position. As indicated schematically according to an exemplary embodiment in FIGS. 20, 21A-21C, 22A-22C and 23, the size/shape/form of bladder BL upon inflation by actuator/actuation system AT may operate as a stop STP within adjustment mechanism SD. See also FIGS. 24, 25, 26A-26B, 27A-27B and 28A-28B.

As indicated schematically in FIGS. 2A-2B, 6A-6C, 7A-7C, 8A-8B, 12A-12B and 13A-13B, cushion frame CF may comprise a front section and a back section; adjustment mechanism SD may be configured to adjust the position of cushion frame CF by pivotal movement of the front section of cushion frame CF; the front section of cushion frame CF may comprise an inward section and an outward section; adjustment mechanism SD may comprise a set of adjusters comprising an inward adjuster BL and an outward adjuster BL; adjustment mechanism SD may comprise an inward adjuster BL and an outward adjuster BL. As indicated schematically in FIGS. 8A-8B and 13A-13B, adjustment mechanism SD for cushion frame CF may be configured to move the inward section of the front section independently of the outward section; adjustment mechanism SD may be configured to move the outward section of the front section independently of the inward section; the adjustment mechanism may be configured to move the outward section of the front section independently by actuation of the outward adjuster of the adjustment mechanism; adjustment mechanism SD may be configured to move the inward section of the front section independently by actuation of the inward adjuster of the adjustment mechanism; adjustment mechanism SD may be configured to move the inward section of the front section by actuation of the inward adjuster BL of the adjustment mechanism SD and to move the outward section of the front section independently by actuation of the outward adjuster BL of the adjustment mechanism.

As indicated schematically in FIGS. 6A-6C, 7A-7C and 12A-12B, adjustment mechanism SD for cushion frame CF may be configured to move simultaneously the inward section of the front section by actuation of inward adjuster BL of adjustment mechanism SD and the inward section of the front section independently by actuation of inward adjuster BL of adjustment mechanism SD; adjustment mechanism SD may comprise a set of adjusters comprising the inward adjuster BL and the outward adjuster BL; the inward adjuster BL may be separately operable and the outward adjuster BL may be separately operable. See FIGS. 8A-8B and 13A-13B.

As indicated schematically in FIGS. 6A-6C, 7A-7C, 8A-8B, 12A-12B and 13A-13B, adjustment mechanism SD for cushion frame CF may comprise a set of adjusters BL comprising the inward adjuster and the outward adjuster; the inward adjuster may be operable with the outward adjuster; the set of adjusters BL may comprise an outward adjuster comprising an air bladder at the right adjacent a door panel and an inward adjuster comprising an air bladder at the left adjacent a center console. See also FIGS. 1B and 2A-2B.

As indicated schematically in FIGS. 3, 4A-4B, 5A-5B, 6A-6C, 7A-7C, 11, 12A-12B, 13A-13B, 14A-14B, 15A-15B, 16A-16C, 17A-17B, 18A-18B, 19A-19C, 26A-26B, 27A-27B and 28A-28B, the form of adjuster/bladder BL may be provided in any of a variety of shapes/forms including cylindrical form (FIGS. 11, 12A-12B, 13A-13B), disc-shaped form (FIGS. 14A-14B, 15A-15B, 16A-16C, 26A-26B), ball-shaped form (FIGS. 17A-17B, 18A-18B, 19A-19C, 27A-27B, 28A-28B), dome-shaped form (FIGS. 3, 4A-4B, 5A-5B, 6A-6C, 7A-7C), single-segment form, multi-segment form, with interface/cap/top, with interface/bottom/dome, etc.

As indicated schematically in FIGS. 3, 21A-21C, 23, 24, 25, 26A-26B, 27A-27B and 28A-28B, adjustment mechanism SD with adjuster BL may comprise a stop STP and a structure/frame BR providing an interface such as a mount, base, bracket, compliant element, etc.; as indicated schematically, the structure/frame may comprise a piston arrangement PS for the adjustment mechanism SD with adjuster BL.

As indicated schematically in FIGS. 3, 4A-4B, 5A-5B, 6A-6C, 7A-7C, 9A-9C, 10A-10B, 11 and 12A-12B, the adjuster of the adjustment mechanism for cushion frame CF of seat ST may comprise an upright form and/or generally cylindrical form. See also FIGS. 16A-16C and 19A-19C. As indicated schematically in FIGS. 3, 4A-4B, 5A-5B, 6A-6C, 7A-7C, 9A-9C, 10A-10B, 11 and 12A-12B, adjuster BL may comprise a housing containing a bladder arrangement; the bladder arrangement may be mounted on bracket BR at an offset/angle; the adjuster may comprise a generally cylindrical housing containing a bladder arrangement. As indicated schematically in FIGS. 3, 4A-4B, 5A-5B, 6A-6C, 7A-7C, 9A-9C, 10A-10B, 11 and 12A-12B, adjuster BL may comprise a generally expandable bladder; adjuster BL may comprise a generally expandable bladder inflatable by the actuator; adjuster BL may comprise a generally expandable bladder inflatable by the actuator and deflatable by the actuator; the adjuster shown as bladder BL may comprise a variety of forms; the bladder may comprise a generally cylindrical-shaped form; the bladder may comprise a generally cylindrical-shaped form when inflated; the bladder may comprise a disc-shaped form; the bladder may comprise a disc-shaped form when inflated; the bladder may comprise a multiple disc-shaped form; the bladder may comprise a ball-shaped form; the bladder may comprise a ball-shaped form when inflated; the bladder may comprise a multiple ball-shaped form; the bladder may comprise a bubble shape; the bladder may be configured to be generally flat when deflated.

As indicated schematically in FIGS. 3, 4A-4B, 5A-5B, 6A-6C, 7A-7C, 9A-9C, 10A-10B, 11 and 12A-12B, adjustment mechanism SD may comprise a spring mechanism SP configured to bias adjuster BL to move cushion frame CF toward the lowered position.

Figure 29A:
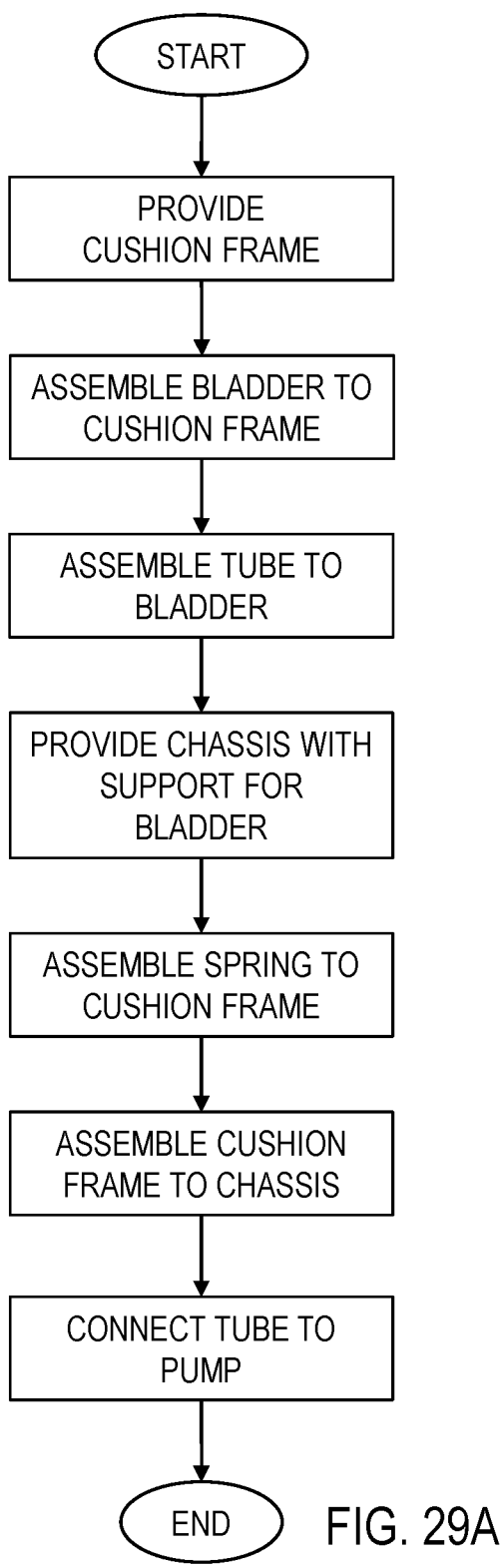
FIG. 29A is a schematic flow diagram of a process to manufacture a seat for a vehicle.
Figure 29B:
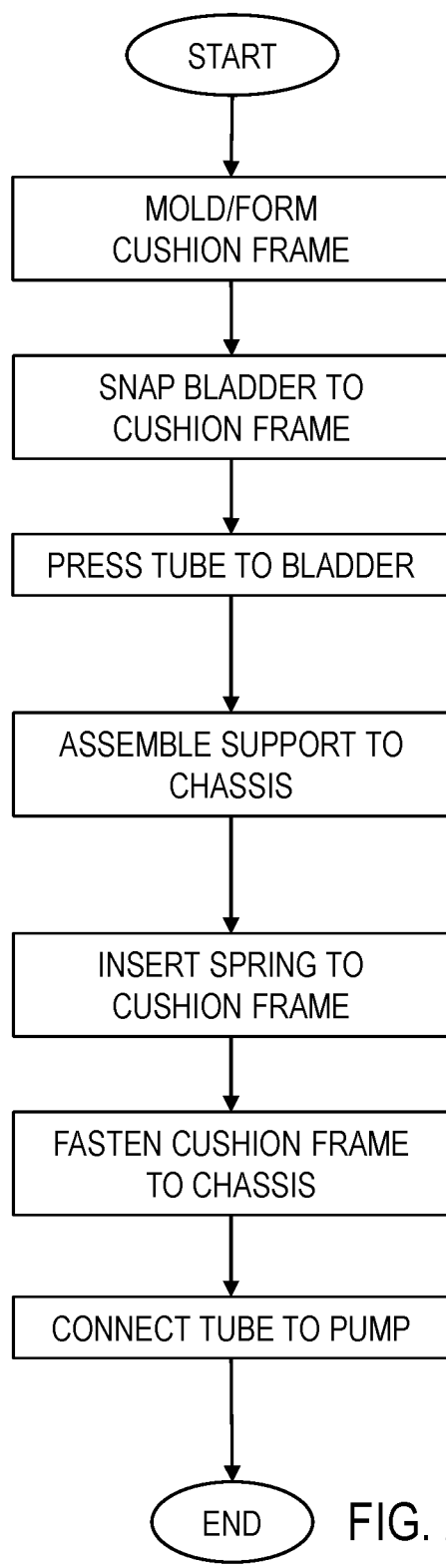
FIG. 29B is a schematic flow diagram of a process to manufacture a seat for a vehicle.

As indicated schematically according to an exemplary embodiment in FIGS. 29A and 29B, the seat adjustment mechanism may be assembled/installed in the seat by a process comprising a set of steps including assembly of the adjuster to the frame and with the cushion frame for the seat.

Exemplary Embodiments—A

According to an exemplary embodiment as shown schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 16A-16C, 19A-19B, 20, 21A-21C, 23, 24, 25, 26A-26B, 27A-27B and 28A-28B, a seat for a vehicle may comprise a back assembly; a cushion assembly comprising a base frame and a cushion frame coupled to the base frame; and an adjustment mechanism configured to move the cushion frame relative to the base frame between a lowered position and a raised position. The adjustment mechanism may comprise a pneumatic actuator. The base frame may comprise a chassis. The adjustment mechanism may be operated by a control panel. The adjustment mechanism may comprise an adjuster system. The adjustment mechanism may comprise an adjuster. The adjuster may comprise a bladder. The bladder may comprise at least one of (a) a membrane; (b) a chamber; (c) an airbag; (d) an inflatable bladder. The bladder may be configured to be inflated for the raised position and to be deflated for the lowered position; the bladder may be configured to be partially inflated for at least one intermediate position between the raised position and the lowered position. The bladder may comprise at least one of (a) a generally cylindrical-shaped form when inflated; (b) a disc-shaped form when inflated; (c) a multiple disc-shaped form; (d) a ball-shaped form when inflated; (e) a multiple ball-shaped form; (f) a bubble shape. The bladder may be configured to be generally flat when deflated. The seat may comprise an actuator and a bladder for the adjustment mechanism; the actuator may be configured to inflate the bladder and to deflate the bladder. The actuator may be configured by operation at a control panel to inflate the bladder and to deflate the bladder. The actuator may be coupled to the adjustment mechanism by a connector; the actuator may comprise a pneumatic actuator and the adjustment mechanism may comprise a bladder arrangement and the connector may comprise a tube. The adjustment mechanism may comprise an adjuster comprising a bladder system; the bladder system may comprise a multi-segment bladder; the multi-segment bladder may comprise a multi-chamber arrangement. The adjustment mechanism may comprise an adjuster comprising a bladder arrangement comprising at least two segments. The adjustment mechanism may comprise an adjuster comprising a generally expandable bladder inflatable by an actuator and deflatable by the actuator. The adjustment mechanism may comprise a frame and an adjuster. The frame may comprise an interface for the adjuster. The frame may comprise an interface comprising a compliant element for the adjuster. The frame may comprise an interface comprising a mount for the adjuster. The frame may comprise an interface comprising a dome-shaped seat for the adjuster. The frame may comprise a bracket. The bracket of the frame may comprise a mounting bracket. The adjustment mechanism may comprise an adjuster. The seat may comprise an interface between the adjuster and the cushion frame. The seat may comprise an interface comprising a compliant element for the adjuster and the cushion frame. The seat may comprise an interface comprising a recess for the adjuster at the cushion frame. The interface may comprise a stop of movement of the adjuster at the raised position; the stop may comprise at least one of (a) a mechanical stop; (b) the adjuster; (c) the bladder. The cushion frame may be pivotally coupled with the base frame. The cushion frame may comprise a back section and a front section movable to the raised position and the lowered position. The front section of the cushion frame may comprise an inward section and an outward section; the adjustment mechanism may be configured to move the inward section of the front section independently of the outward section; the adjustment mechanism may be configured to move the outward section of the front section independently of the inward section. The adjustment mechanism may comprise an inward adjuster and an outward adjuster. The adjustment mechanism may be configured to tilt the inward section of the front section independently by actuation of the inward adjuster of the adjustment mechanism. The adjustment mechanism may be configured to tilt the outward section of the front section independently by actuation of the outward adjuster of the adjustment mechanism. The adjustment mechanism may be configured to move the inward section of the front section independently by actuation of the inward adjuster of the adjustment mechanism and to move the inward section of the front section independently by actuation of the inward adjuster of the adjustment mechanism. The adjustment mechanism may be configured to move simultaneously the inward section of the front section by actuation of the inward adjuster of the adjustment mechanism and the inward section of the front section by actuation of the inward adjuster of the adjustment mechanism. The adjustment mechanism may comprise a set of adjusters comprising the inward adjuster and the outward adjuster; the inward adjuster may be separately operable and the outward adjuster may be separately operable. The adjustment mechanism may comprise a set of adjusters comprising the inward adjuster and the outward adjuster; the inward adjuster may be operable with the outward adjuster. The adjustment mechanism may comprise an adjuster. The adjuster may comprise a housing containing a bladder arrangement. The adjustment mechanism may comprise a spring mechanism configured to bias the adjuster to move the cushion frame toward the lowered position. The seat may comprise a controller; the controller may be configured to facilitate selective actuation of at least one pneumatic actuator to move the cushion frame. The seat may comprise a controller; the controller may be configured to facilitate selective actuation of at least one pneumatic actuator to move the cushion frame and to move at least one of (a) a lumbar support; (b) a head restraint; (c) a bolster. The controller may be operated by a control panel. The adjustment mechanism may comprise at least one air bladder; the at least one air bladder may be configured to at least one of (a) expand to move the cushion frame; (b) contract to move the cushion frame.

According to an exemplary embodiment as shown schematically in the FIGURES, a seat for a vehicle may comprise a back assembly; a cushion assembly comprising a chassis and a cushion frame coupled to the chassis; and a mechanism configured to move the cushion frame relative to the chassis between a lowered position and a raised position. The mechanism may comprise at least one pneumatic actuator. The seat may comprise a controller; the controller may be configured to facilitate selective actuation of the at least one pneumatic actuator to move the cushion frame and move at least one of (a) a lumbar support; (b) a head restraint; (c) a bolster. The mechanism may be configured to expand an air bladder to move the cushion frame toward the raised position; the mechanism may be configured to contract the air bladder to move the cushion frame toward the lowered position. The mechanism may comprise at least one air bladder; the at least one air bladder may be configured to at least one of (a) expand to move the cushion frame; (b) contract to move the cushion frame. The at least one air bladder may comprise a right air bladder and a left air bladder; the right air bladder may be configured to move a right side of the cushion frame; the left air bladder may be configured to move a left side of the cushion frame; the right air bladder and the left air bladder are configured to expand to move the cushion frame toward the raised position. One of the right air bladder and the left air bladder may be configured to expand and the other of the right air bladder and the left air bladder may be configured to remain fixed to tilt the cushion frame. The chassis may comprise a bracket configured to support the at least one air bladder. The at least one air bladder may be positioned between the bracket and the cushion frame. The chassis may comprise a cross member; the bracket may be coupled to the cross member. The cushion frame may be configured to rotate relative to the chassis at a pivot. The seat may comprise a spring configured to bias the cushion frame toward the lowered position. The spring may comprise a rear portion coupled to the chassis and a front portion coupled to the cushion frame.

Exemplary Embodiments—B

According to an exemplary embodiment as shown schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 16A-16C, 19A-19B, 20, 21A-21C, 23, 24, 25, 26A-26B, 27A-27B and 28A-28B, a seat for a vehicle may comprise a back assembly; a cushion assembly comprising a base frame and a cushion frame coupled to the base frame; and an adjustment mechanism configured to move the cushion frame relative to the base frame between a lowered position and a raised position. See also FIGS. 2A-2B. The adjustment mechanism may comprise a pneumatic actuator. The base frame may comprise a chassis. The adjustment mechanism may be operated by a control panel. The adjustment mechanism may comprise an adjuster system. The adjustment mechanism may comprise an adjuster system comprising at least one adjuster. The adjustment mechanism may comprise an adjuster system comprising a set of adjusters. The adjustment mechanism may comprise an adjuster. The adjuster may comprise a bladder. The bladder may comprise a membrane. The bladder may comprise a chamber. The bladder may comprise an airbag. The bladder may comprise an inflatable bladder. The bladder may comprise a chamber that is inflatable and deflatable.

The bladder may be configured to be inflated for the raised position and to be deflated for the lowered position. The bladder may be configured to be partially inflated for an intermediate position between the raised position and the lowered position. The bladder may be configured to be partially inflated for at least one intermediate position between the raised position and the lowered position. The bladder may comprise a generally cylindrical-shaped form. The bladder may comprise a generally cylindrical-shaped form when inflated. The bladder may comprise a disc-shaped form. The bladder may comprise a disc-shaped form when inflated. The bladder may comprise a multiple disc-shaped form. The bladder may comprise a ball-shaped form. The bladder may comprise a ball-shaped form when inflated. The bladder may comprise a multiple ball-shaped form. The bladder may comprise a bubble shape. The bladder may be configured to be generally flat when deflated. The seat may comprise an actuator and a bladder for the adjustment mechanism. The bladder may comprise at least one bladder. The actuator may be configured to inflate the bladder and to deflate the bladder. The actuator may be configured by operation at a control panel to inflate the bladder and to deflate the bladder. The actuator may be coupled to the adjustment mechanism by a connector. The actuator may comprise a pneumatic actuator. The adjustment mechanism may comprise a bladder arrangement. The connector may comprise a pneumatic hose. The connector may comprise a tube. The adjustment mechanism may comprise an adjuster comprising a bladder system; the bladder system may comprise a multi-segment bladder. The multi-segment bladder may comprise a multi-chamber arrangement. The adjuster may comprise a bladder comprising at least two segments. The adjuster may comprise a bladder arrangement. The adjuster may comprise a bladder arrangement comprising at least two segments. The adjuster may comprise a generally expandable bladder inflatable by an actuator. The adjuster may comprise a generally expandable bladder inflatable by an actuator and deflatable by the actuator. The adjustment mechanism may comprise a frame and an adjuster. The frame may comprise an interface for the adjuster. The frame may comprise an interface comprising a compliant member for the adjuster. The frame may comprise an interface comprising a compliant element for the adjuster. The frame may comprise an interface comprising a mount for the adjuster. The frame may comprise an interface comprising a seat mount for the adjuster. The frame may comprise an interface comprising a dome-shaped seat for the adjuster. The frame may comprise a bracket. The bracket of the frame may comprise a mounting bracket. The bracket may comprise a compliant member. The adjustment mechanism may comprise an adjuster. The seat may comprise an interface between the adjuster and the cushion frame. The seat may comprise an interface comprising a compliant member for the adjuster and the cushion frame. The seat may comprise an interface comprising a compliant element for the adjuster and the cushion frame. The seat may comprise an interface comprising a recess for the adjuster at the cushion frame. The seat may comprise an interface comprising a recess for the adjuster in the cushion frame. The interface may comprise a stop of movement of the adjuster at the raised position. The stop may comprise a mechanical stop. The stop may comprise the adjuster. The stop may comprise the adjuster comprising a bladder. The stop may comprise a mechanical stop and/or the bladder. The interface may comprise a stop of movement of the adjuster at the lower position. The cushion frame may be pivotally coupled with the base frame. The cushion frame may comprise a front section and a back section. The cushion frame may comprise a back section and a front section movable to the raised position and the lowered position. The adjustment mechanism may be configured to adjust the position of the cushion frame by pivotal movement of the front section of the cushion frame. The front section of the cushion frame may comprise an inward section and an outward section. The adjustment mechanism may be configured to move the inward section of the front section independently of the outward section. The adjustment mechanism may be configured to move the outward section of the front section independently of the inward section. The adjustment mechanism may comprise a set of adjusters comprising an inward adjuster and an outward adjuster. The adjustment mechanism may comprise an inward adjuster and an outward adjuster. The adjustment mechanism may be configured to move the outward section of the front section independently by actuation of the outward adjuster of the adjustment mechanism. The adjustment mechanism may be configured to move the inward section of the front section independently by actuation of the inward adjuster of the adjustment mechanism. The adjustment mechanism may be configured to tilt the inward section of the front section independently by actuation of the inward adjuster of the adjustment mechanism. The adjustment mechanism may be configured to tilt the outward section of the front section independently by actuation of the outward adjuster of the adjustment mechanism. The adjustment mechanism may be configured to move the inward section of the front section independently by actuation of the inward adjuster of the adjustment mechanism and to move the inward section of the front section independently by actuation of the inward adjuster of the adjustment mechanism. The adjustment mechanism may be configured to move simultaneously the inward section of the front section by actuation of the inward adjuster of the adjustment mechanism and the inward section of the front section by actuation of the inward adjuster of the adjustment mechanism. The adjustment mechanism may comprise a set of adjusters comprising the inward adjuster and the outward adjuster; the inward adjuster may be separately operable and the outward adjuster may be separately operable. The adjustment mechanism may comprise a set of adjusters comprising the inward adjuster and the outward adjuster; the inward adjuster may be operable with the outward adjuster. The set of adjusters may comprise an outward adjuster comprising an air bladder at the right adjacent a door panel and an inward adjuster comprising an air bladder at the left adjacent a center console. The adjustment mechanism may comprise an adjuster. The adjuster may comprise a generally cylindrical form. The adjuster may comprise a housing containing a bladder arrangement. The adjuster may comprise a generally cylindrical housing containing a bladder arrangement. The adjuster may comprise a generally expandable bladder. The adjustment mechanism may comprise a spring mechanism configured to bias the adjuster to move the cushion frame toward the lowered position. The adjustment mechanism may comprise at least one pneumatic actuator configured to actuate movement of at least one of (a) a lumbar support; (b) a head restraint; (c) a bolster. The seat may comprise a controller; the controller may be configured to facilitate selective actuation of the at least one pneumatic actuator to move the cushion frame. The seat may comprise a controller; the controller may be configured to facilitate selective actuation of the at least one pneumatic actuator to move the cushion frame and to move at least one of (a) a lumbar support; (b) a head restraint; (c) a bolster. The controller may be operated by a control panel. The seat may comprise a mechanism comprising the adjustment mechanism; the mechanism may be configured for adjustment of at least one of (a) a lumbar support; (b) a head restraint; (c) a bolster. The seat may comprise a mechanism comprising the adjustment mechanism; the mechanism may be configured for adjustment the cushion frame and at least one of (a) a lumbar support; (b) a head restraint; (c) a bolster. The mechanism may comprise at least one pump and at least one valve. The adjustment mechanism may comprise at least one bladder; the at least one bladder may comprise an air bladder. The mechanism may be configured to expand the air bladder to move the cushion frame toward the raised position; the mechanism may be configured to contract the air bladder to move the cushion frame toward the lowered position. The adjustment mechanism may comprise at least one air bladder. The at least one air bladder may be configured to at least one of (a) expand to move the cushion frame; (b) contract to move the cushion frame. The at least one air bladder may comprise an outward air bladder at the right and an inward air bladder at the left. The at least one air bladder may comprise an outward air bladder at the right adjacent a door panel of the vehicle and an inward air bladder at the left adjacent a center console of the vehicle. The base frame may be configured to mount a bracket of the adjustment mechanism; an adjuster of the adjustment mechanism may be coupled to the bracket; the adjuster may be positioned between the bracket and the cushion frame.

Exemplary Embodiments—C

According to an exemplary embodiment as shown schematically in FIGS. 3, 3A, 4A-4B, 5A-5B, 6A-6C, 7A-7C, 8A-8B, 9A-9C, 10A-10C, 11, 12A-12B, 13A-13B, 14A-14B, 15A-15B, 16A-16C, 19A-19B, 20, 21A-21C, 23, 24, 25, 26A-26B, 27A-27B and 28A-28B, a seat ST for a vehicle may comprise a back assembly SK, a cushion assembly SC comprising a chassis CH and a cushion frame CF coupled to the chassis, and a mechanism configured to move the cushion frame relative to the chassis between a lowered position (as shown schematically in FIGS. 6A-6C) and a raised position (as shown schematically in FIGS. 7A-7C). See also FIGS. 2A-2B. The mechanism may comprise at least one pneumatic actuator. The at least one pneumatic actuator may be configured to actuate movement of at least one of (a) a lumbar support; (b) a head restraint; (c) a bolster. The seat may comprise a controller; the controller may be configured to facilitate selective actuation of the at least one pneumatic actuator to move the cushion frame and move at least one of (a) a lumbar support; (b) a head restraint; (c) a bolster. The mechanism may comprise at least one pump and at least one valve. The mechanism may be configured to expand an air bladder BL to move the cushion frame toward the raised position; the mechanism may be configured to contract the air bladder to move the cushion frame toward the lowered position. The mechanism may comprise at least one air bladder BL. The at least one air bladder may be configured to at least one of (a) expand to move the cushion frame; (b) contract to move the cushion frame. The at least one air bladder may comprise a right air bladder and a left air bladder. The right air bladder may be configured to move a right side of the cushion frame; the left air bladder may be configured to move a left side of the cushion frame. The right air bladder and the left air bladder may be configured to expand to move the cushion frame toward the raised position. One of the right air bladder and the left air bladder may be configured to expand and the other of the right air bladder and the left air bladder may be configured to remain fixed to tilt the cushion frame. The chassis may comprise a bracket BR configured to support the at least one air bladder. The at least one air bladder may be positioned between the bracket and the cushion frame. The chassis may comprise a crossmember; the bracket may be coupled to the cross member. The cushion frame may be configured to rotate relative to the chassis at a pivot PV. The seat may comprise a spring SP configured to bias the cushion frame toward the lowered position. The spring may comprise a rear portion coupled to the chassis and a front portion coupled to the cushion frame. The spring may comprise a wire.

According to an exemplary embodiment as shown schematically in FIG. 29A, a process of manufacturing a seat for a vehicle may comprise providing a cushion frame; assembling a bladder to the cushion frame; assembling a tube to the bladder; providing a chassis with a support for the bladder; assembling a spring to the cushion frame; assembling the cushion frame to the chassis; and connecting the tube to a pump.

According to an exemplary embodiment as shown schematically in FIG. 29B, a process of manufacturing a seat for a vehicle may comprise molding/forming a cushion frame; snapping a bladder to the cushion frame; pressing a tube to the bladder; assembling a support to a chassis; inserting a spring to the cushion frame; fastening the cushion frame to the chassis; and connecting the tube to a pump.

TABLE A

REFERENCE SYMBOL LIST

| ELEMENT, PART OR COMPONENT | REF SYMBOL |
|---|---|
| Vehicle | V |
| Interior | I |
| Seat/assembly | ST |
| Seat Back/assembly | SK |
| Seat Cushion/assembly | SC |
| Seat base/frame | SB |
| Control panel | CP |
| Spring/spring system | SP |
| Suspension/assembly | SN |
| Cushion frame/assembly | CF |
| Adjuster mechanism/Seat cushion adjuster | SD |
| Connector/tube/Hose | HS |
| Adjuster/Bladder/bladder arrangement | BL |
| Chassis/frame | CH |
| Actuator/pneumatic system | AT |
| Bracket/frame/assembly | BR |
| Piston/piston arrangement | PS |
| Pivot/axle/pivot point | PV |
| Stop | STP |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A seat for a vehicle comprising:
a back assembly;
a cushion assembly comprising a base frame and a cushion frame coupled to the base frame; and
an adjustment mechanism configured to move the cushion frame relative to the base frame between a lowered position and a raised position;
wherein the adjustment mechanism comprises a frame and an adjuster;
wherein the frame comprises an interface comprising a dome-shaped seat for the adjuster;
wherein the adjustment mechanism comprises at least one air bladder;
wherein the at least one air bladder is configured to at least one of (a) expand to move the cushion frame; (b) contract to move the cushion frame;
wherein the at least one air bladder comprises a right air bladder and a left air bladder;
wherein the right air bladder is configured to move a right side of the cushion frame;
wherein the left air bladder is configured to move a left side of the cushion frame;
wherein the right air bladder and the left air bladder are configured to expand to move the cushion frame toward the raised position.

2. The seat of claim 1 further comprising an interface comprising a recess for the adjuster at the cushion frame.

3. The seat of claim 1 wherein the frame comprises a compliant element for the adjuster.

4. The seat of claim 1 wherein one of the right air bladder and the left air bladder is configured to expand and the other of the right air bladder and the left air bladder is configured to remain fixed to tilt the cushion frame.

5. The seat of claim 1 wherein the base frame comprises a chassis; wherein the chassis comprises a bracket configured to support the at least one air bladder; wherein the at least one air bladder is positioned between the bracket and the cushion frame.

6. A seat for a vehicle comprising:
a back assembly;
a cushion assembly comprising a base frame and a cushion frame coupled to the base frame;
an adjustment mechanism comprising an adjuster and configured to move the cushion frame relative to the base frame between a lowered position and a raised position;
an interface comprising a compliant element between the adjuster and the cushion frame; and
an interface comprising a recess for the adjuster at the cushion frame;
wherein the adjustment mechanism comprises a spring mechanism configured to bias the adjuster to move the cushion frame toward the lowered position.

7. The seat of claim 6 further comprising a stop of movement of the adjuster at the raised position.

8. The seat of claim 6 wherein the cushion frame comprises a back section and a front section movable to the raised position and the lowered position.

9. The seat of claim 8 wherein the front section of the cushion frame comprises an inward section and an outward section; wherein the adjustment mechanism is configured to move the inward section of the front section independently of the outward section; wherein the adjustment mechanism is configured to move the outward section of the front section independently of the inward section.

10. The seat of claim 9 wherein the adjustment mechanism comprises an inward adjuster and an outward adjuster.

11. The seat of claim 10 wherein the adjustment mechanism is configured to tilt the inward section of the front section independently by actuation of the inward adjuster of the adjustment mechanism.

12. The seat of claim 6 wherein the adjustment mechanism comprises at least one air bladder.

13. The seat of claim 12 wherein the base frame comprises a chassis; wherein the chassis comprises a cross member and a bracket configured to support the at least one air bladder; wherein the bracket is coupled to the cross member.

14. The seat of claim 13 wherein the cushion frame is configured to rotate relative to the chassis at a pivot.

15. A seat for a vehicle comprising:
a back assembly;
a cushion assembly comprising a base frame and a cushion frame coupled to the base frame;
an adjustment mechanism comprising an adjuster and configured to move the cushion frame relative to the base frame between a lowered position and a raised position;
an interface comprising a compliant element between the adjuster and the cushion frame; and
an interface comprising a recess for the adjuster at the cushion frame;
wherein the adjustment mechanism comprises at least one air bladder;
wherein the base frame comprises a chassis;

wherein the chassis comprises a cross member and a bracket configured to support the at least one air bladder;

wherein the bracket is coupled to the cross member.

16. The seat of claim 15 wherein the cushion frame comprises a back section and a front section movable to the raised position and the lowered position.

17. The seat of claim 16 wherein the front section of the cushion frame comprises an inward section and an outward section; wherein the adjustment mechanism is configured to move the inward section of the front section independently of the outward section; wherein the adjustment mechanism is configured to move the outward section of the front section independently of the inward section.

18. A seat for a vehicle comprising:
   a back assembly;
   a cushion assembly comprising a base frame and a cushion frame coupled to the base frame; and
   an adjustment mechanism configured to move the cushion frame relative to the base frame between a lowered position and a raised position;
   wherein the adjustment mechanism comprises a frame and an adjuster;
   wherein the frame comprises an interface comprising a seat for the adjuster;
   wherein the adjustment mechanism comprises at least one air bladder;
   wherein the at least one air bladder is configured to at least one of (a) expand to move the cushion frame; (b) contract to move the cushion frame;
   wherein the at least one air bladder comprises a right air bladder and a left air bladder;
   wherein the right air bladder is configured to move a right side of the cushion frame;
   wherein the left air bladder is configured to move a left side of the cushion frame;
   wherein the right air bladder and the left air bladder are configured to expand to move the cushion frame toward the raised position.

19. The seat of claim 18 wherein the adjustment mechanism further comprises an actuator; wherein the actuator is configured to inflate the at least one bladder and to deflate the at least one bladder.

20. The seat of claim 18 wherein the base frame comprises a chassis; wherein the chassis comprises a bracket configured to support the at least one air bladder; wherein the chassis comprises a cross member; wherein the bracket is coupled to the cross member.

* * * * *